US011674893B2

(12) United States Patent
Ino et al.

(10) Patent No.: US 11,674,893 B2
(45) Date of Patent: Jun. 13, 2023

(54) STRUCTURE OF OPTICAL SENSOR HAVING LIGHT-EMITTING ELEMENT AND LIGHT-RECEIVING ELEMENT

(71) Applicant: CANON KABUSHIKI KAISHA, Tokyo (JP)

(72) Inventors: Kazushi Ino, Shizuoka (JP); Takuya Mukaibara, Shizuoka (JP); Junya Azami, Shizuoka (JP); Kazutaka Yaguchi, Shizuoka (JP); Hiroshi Kita, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 17/174,223

(22) Filed: Feb. 11, 2021

(65) Prior Publication Data

US 2021/0255094 A1 Aug. 19, 2021

(30) Foreign Application Priority Data

Feb. 17, 2020 (JP) .............................. JP2020-024667
Dec. 14, 2020 (JP) .............................. JP2020-206984

(51) Int. Cl.
*G01N 21/31* (2006.01)
*G03G 15/00* (2006.01)

(52) U.S. Cl.
CPC .......... *G01N 21/31* (2013.01); *G03G 15/5062* (2013.01); *G01N 2201/021* (2013.01); *G01N 2201/061* (2013.01)

(58) Field of Classification Search
CPC .. G01N 2021/556; G01N 21/31; G01N 21/55; G01N 2201/021; G01N 2201/061; G03G 15/5058; G03G 15/5062; G03G 2215/00616
See application file for complete search history.

(56) References Cited

U.S. PATENT DOCUMENTS

| 4,698,491 A * | 10/1987 | Lysen .................. G01B 11/272 356/152.3 |
| 6,229,721 B1 | 5/2001 | Mano |
| 8,929,784 B2 | 1/2015 | Takazawa |

(Continued)

FOREIGN PATENT DOCUMENTS

| JP | H10-221902 A | 8/1998 |
| JP | 2008-249714 A | 10/2008 |

(Continued)

*Primary Examiner* — Hina F Ayub
(74) *Attorney, Agent, or Firm* — Canon U.S.A., Inc. IP Division

(57) ABSTRACT

A housing includes a first opening and a second opening, and encloses a light-emitting element and a first light receiving unit. The first opening is provided in a first light guide path, and is arranged so that light output from the light-emitting element travels toward a target surface. The second opening is provided in a second light guide path arranged between the target surface and the first light receiving unit. The first opening is an exit opening of a through-hole provided penetrating through the housing, and a shape of the through-hole is a shape in which diffracted light of the +1st order and higher orders and diffracted light of the −1st order and higher orders produced at the target surface to be irradiated are not incident on the first light receiving unit.

34 Claims, 22 Drawing Sheets

(56) References Cited

U.S. PATENT DOCUMENTS

| | | |
|---|---|---|
| 9,075,368 B2 | 7/2015 | Mukaibara |
| 9,195,176 B2 | 11/2015 | Seki |
| 9,927,752 B2 | 3/2018 | Ino |
| 10,228,647 B2 | 3/2019 | Ino |
| 10,503,109 B2 | 12/2019 | Ino |
| 2004/0251435 A1 | 12/2004 | Sawayama |
| 2011/0242376 A1* | 10/2011 | Ando ................. H01L 27/14685 257/E31.127 |
| 2013/0051838 A1 | 2/2013 | Takazawa |
| 2013/0272740 A1 | 10/2013 | Nakagawa |
| 2013/0286133 A1* | 10/2013 | Furuta .................. G03G 15/043 347/118 |
| 2015/0177653 A1 | 6/2015 | Seki |
| 2015/0211992 A1 | 7/2015 | Ishizumi |
| 2017/0131670 A1 | 5/2017 | Ino |
| 2018/0173144 A1 | 6/2018 | Ino |
| 2018/0292776 A1 | 10/2018 | Ino |
| 2020/0223186 A1* | 7/2020 | Sato ........................ B32B 15/08 |

FOREIGN PATENT DOCUMENTS

| | | |
|---|---|---|
| JP | 2013-044878 A | 3/2013 |
| JP | 2013-191835 A | 9/2013 |
| JP | 2015-125187 A | 7/2015 |
| JP | 2017-090597 A | 5/2017 |
| JP | 2018-179681 A | 11/2018 |
| JP | 2019-056831 A | 4/2019 |

\* cited by examiner d = 3.7μm, λ = 850nm INCIDENT ANGLE SWING d = 20μm, λ = 850nm INCIDENT ANGLE SWING

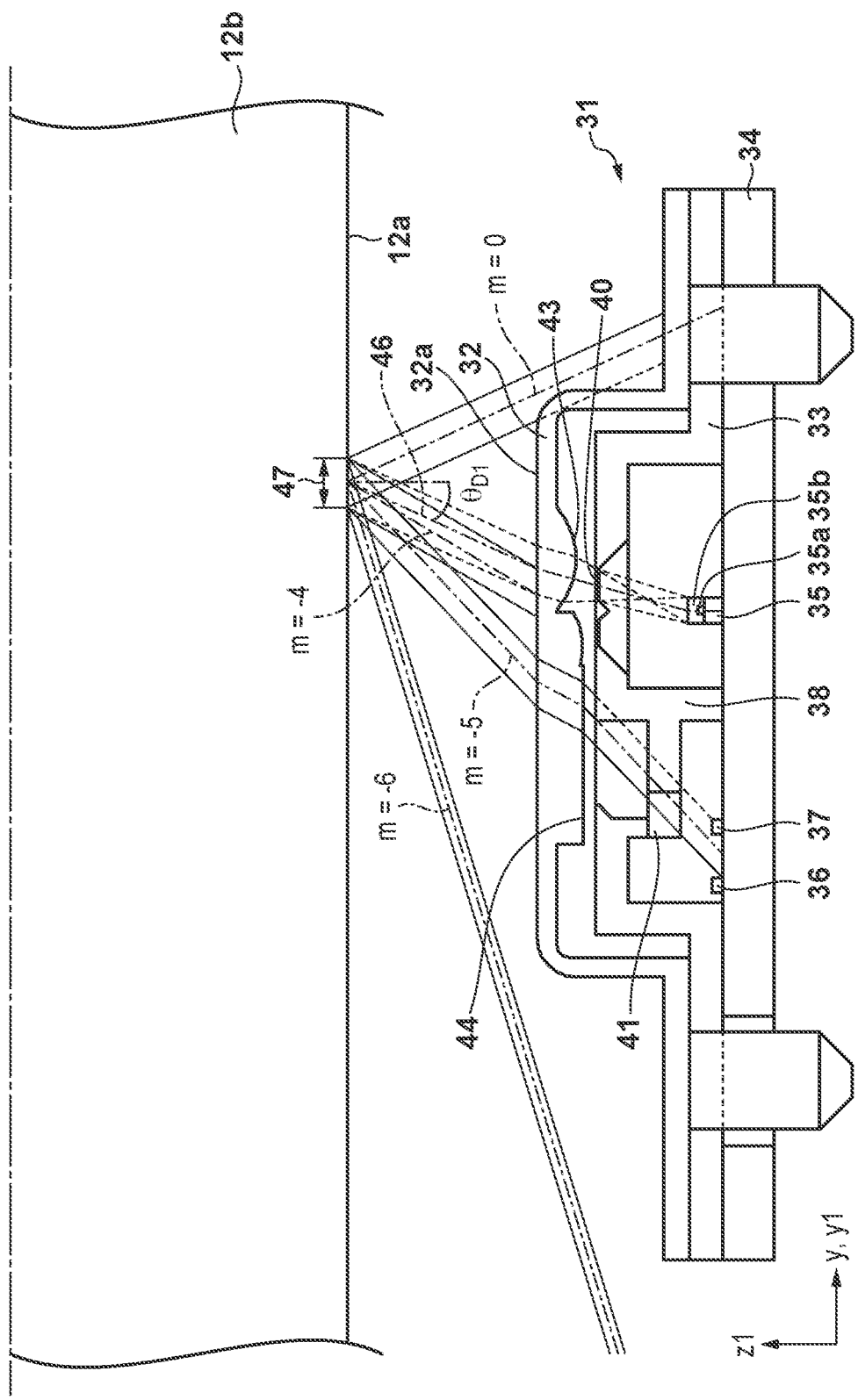

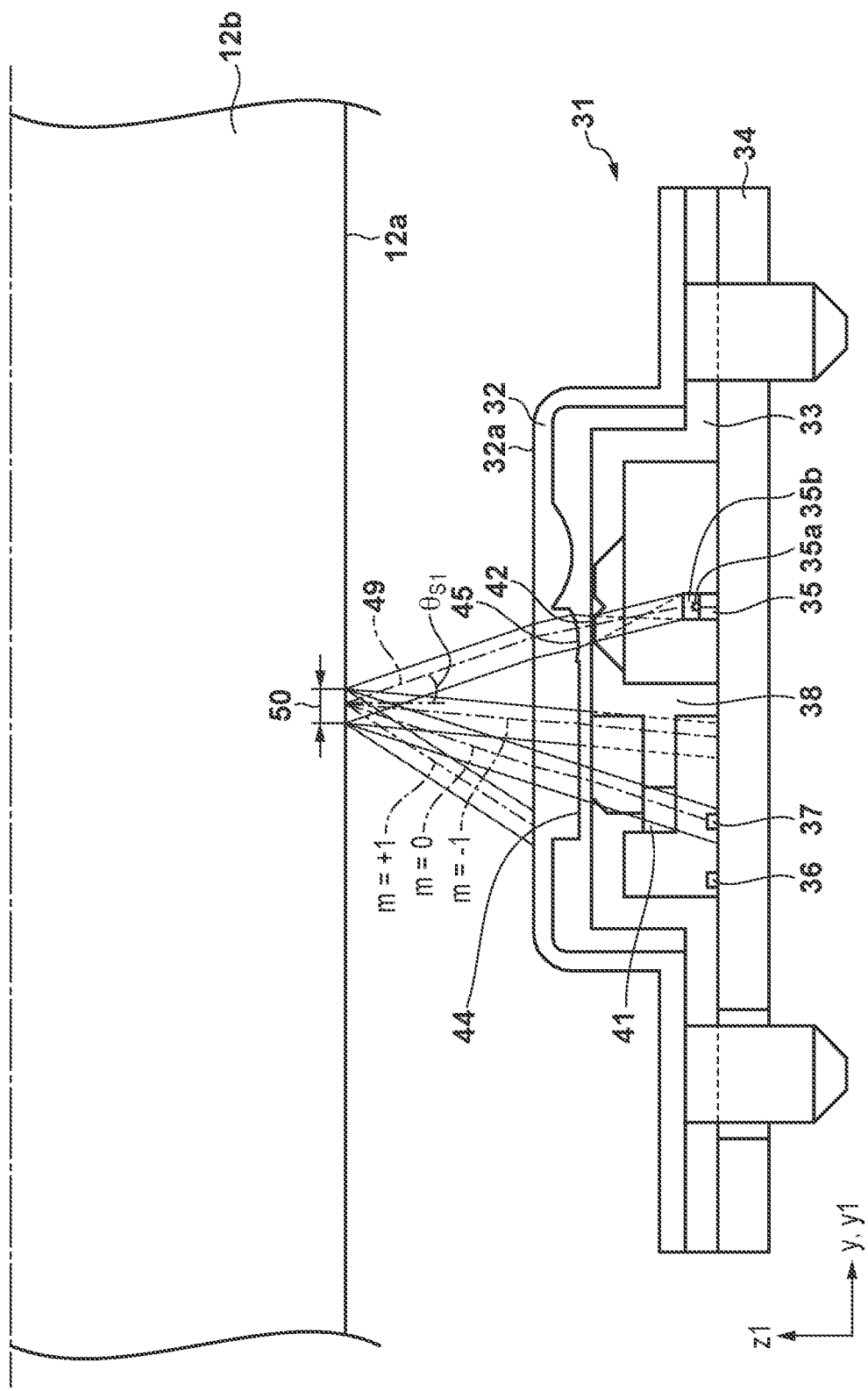

F I G. 12A

| ORDER m | -6TH -ORDER | -5TH -ORDER | -4TH -ORDER | ... | 0TH -ORDER |
|---|---|---|---|---|---|
| DIFFRACTION ANGLE (degree) | -72.89 | -46.55 | -29.76 | ... | +25 |

F I G. 12B

| ORDER m | -1ST -ORDER | 0TH -ORDER | +1ST -OREDER |
|---|---|---|---|
| DIFFRACTION ANGLE (degree) | +5.59 | +19.1 | +33.84 |

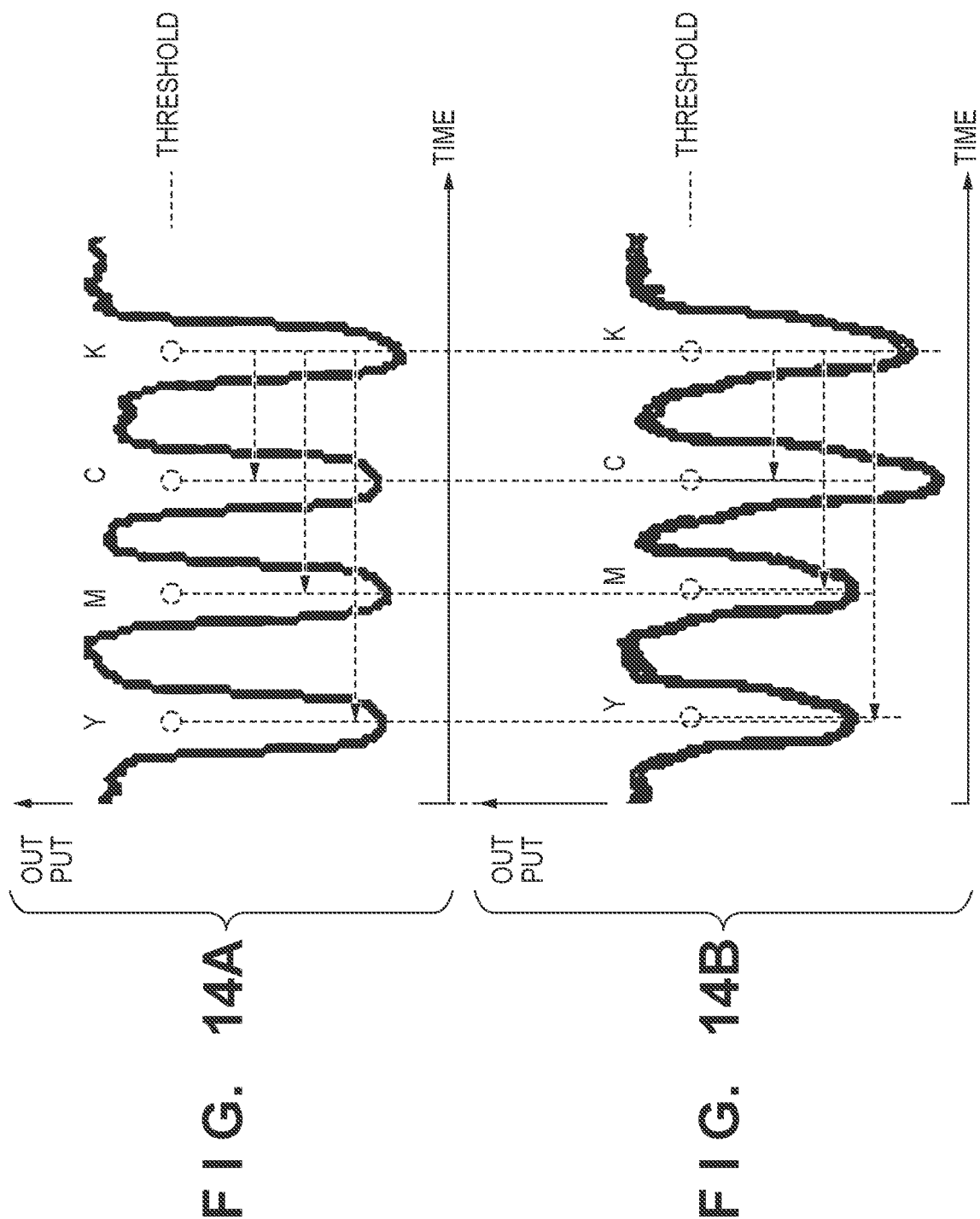

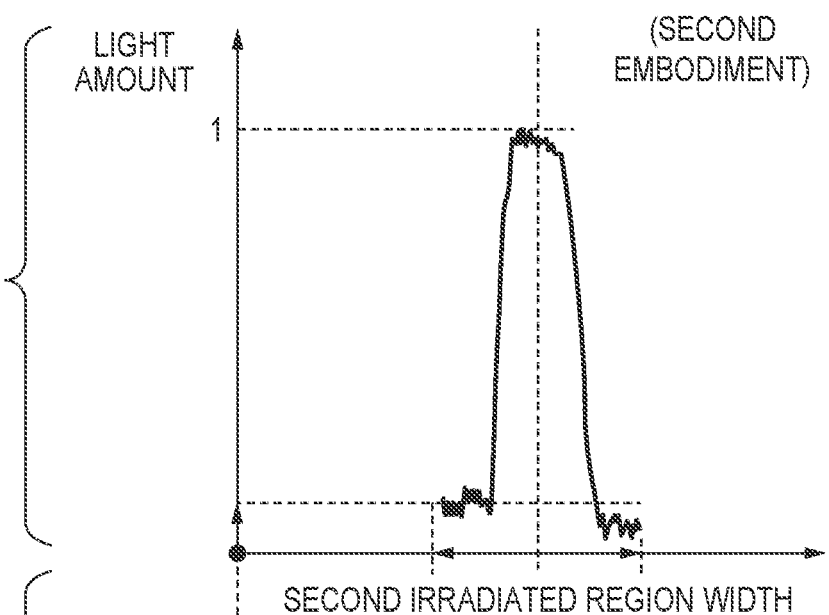
FIG. 18A
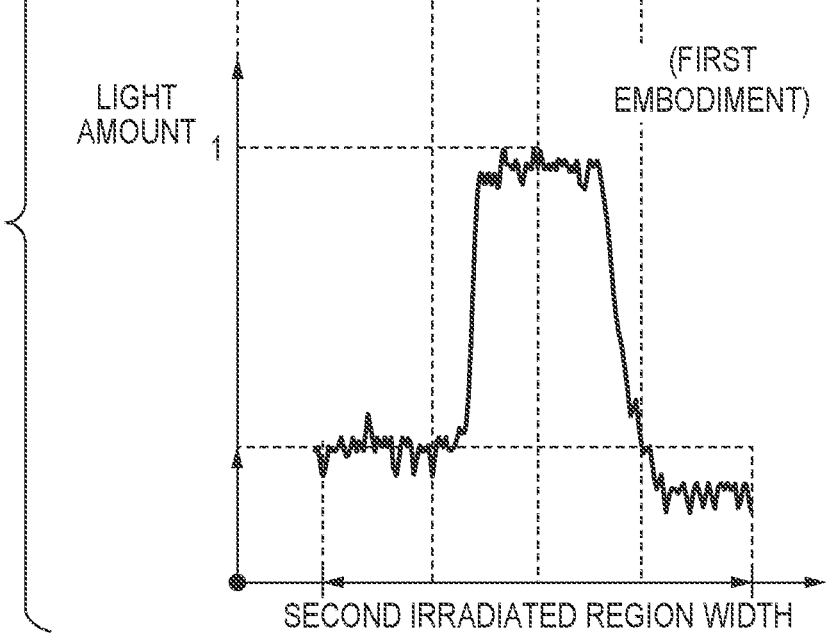
FIG. 18B
FIG. 18C
| UNIT [mm] | FIRST EMBODIMENT | SECOND EMBODIMENT |
|---|---|---|
| LED CHIP WIDTH | 0.37 | 0.23 |
| CLEAR MOLD WIDTH | 3.0 | 1.5 |

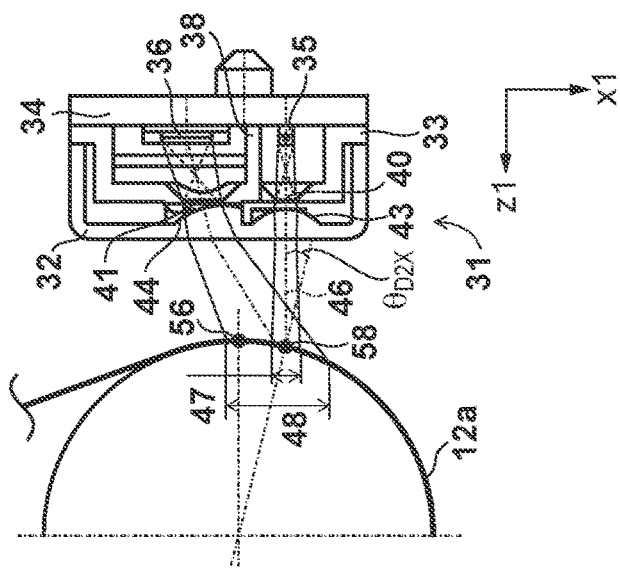
FIG. 20A
FIG. 20B
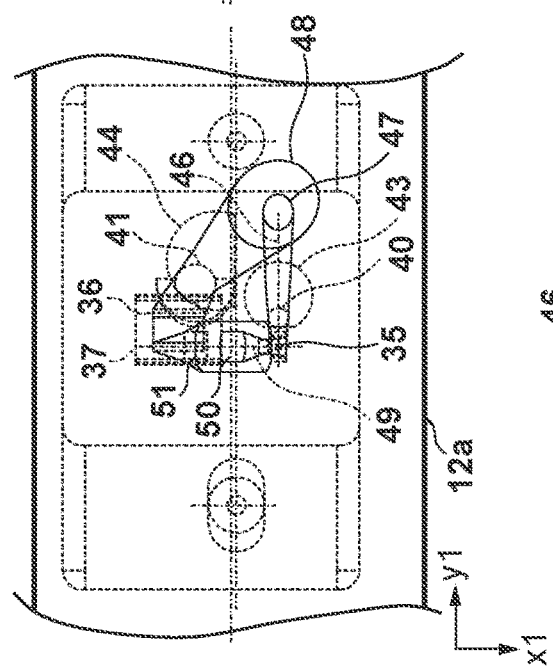
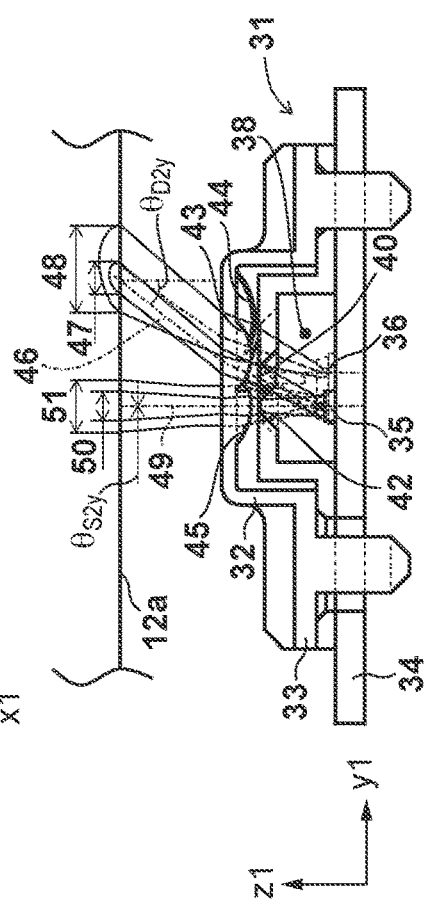
FIG. 20C
FIG. 20D
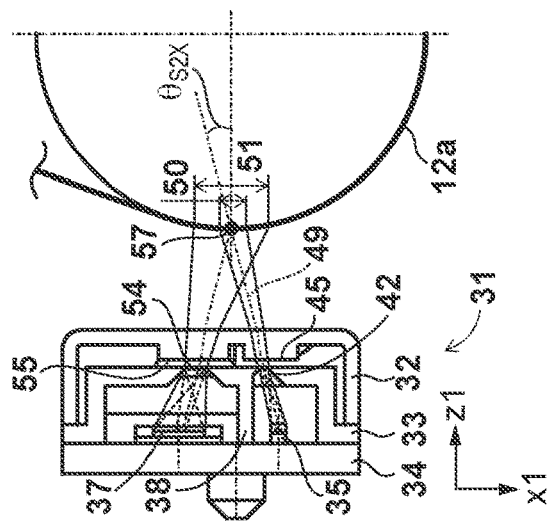

STRUCTURE OF OPTICAL SENSOR HAVING LIGHT-EMITTING ELEMENT AND LIGHT-RECEIVING ELEMENT

BACKGROUND

Field

The present disclosure relates to a structure of an optical sensor having a light-emitting element and a light-receiving element.

Description of the Related Art

An image forming apparatus forms a toner image on a photosensitive drum, transfers the toner image from the photosensitive drum to an intermediate transfer body, and furthermore transfers the toner image from the intermediate transfer body to a sheet. An optical sensor is used to check the transfer position, color reproduction, and the like of the toner image (Japanese Patent Laid-Open No. H10-221902). Such an optical sensor is called a "toner sensor". Toner remaining on the intermediate transfer body is cleaned using a cleaning blade. Uneven shapes such as grooves are sometimes formed in the surface of the intermediate transfer body in order to improve the durability of the cleaning blade (Japanese Patent Laid-Open No. 2013-044878).

A toner sensor receives regularly-reflected light from the surface (substrate) of the intermediate transfer body to detect the intermediate transfer body, and receives diffused reflection light from the toner to detect the toner. However, when grooves or the like are formed in the surface of the intermediate transfer body, the regularly-reflected light from the substrate decreases and the diffused reflection light from the substrate increases. In particular, if diffracted light produced by a plurality of grooves acting as a diffraction grating is incident on a light-receiving element that receives the regularly-reflected light, it is difficult to accurately detect the regularly-reflected light from the substrate.

SUMMARY

Some embodiments of the present disclosure provide an optical sensor comprising: a light-emitting element that emits light toward a target surface to be irradiated set for a target to be measured; a first light receiving unit that receives regularly-reflected light from a surface of the target to be measured; a circuit board on which the light-emitting element and the first light receiving unit are mounted; and a housing including a first opening and a second opening, and provided so as to enclose the light-emitting element and the first light receiving unit, wherein the first opening is provided in a first light guide path arranged between the light-emitting element and the target surface to be irradiated, and is arranged so that light output from the light-emitting element travels toward the target surface to be irradiated, the second opening is provided in a second light guide path arranged between the target surface to be irradiated and the first light receiving unit, and the first opening provided in the housing is an exit opening of a through-hole provided penetrating through the housing, and a shape of the through-hole is a shape in which diffracted light of the +1st order and higher orders and diffracted light of the −1st order and higher orders produced at the target surface to be irradiated are not incident on the first light receiving unit Further features of various embodiments will become apparent from the following description of exemplary embodiments (with reference to the attached drawings).

BRIEF DESCRIPTION OF THE DRAWINGS

FIG. 10 is a diagram illustrating diffracted light of various orders.

FIG. 11 is a diagram illustrating diffracted light of various orders.

FIGS. 12A and 12B are diagrams illustrating diffraction angles of various orders.

FIGS. 14A and 14B are diagrams illustrating test pattern detection results.

FIGS. 18A to 18C are diagrams illustrating a light emission area of a light-emitting element and an effect achieved by making the light emission area smaller.

FIGS. 20A to 20D are diagrams illustrating an optical path of the optical sensor according to the third embodiment.

DESCRIPTION OF THE EMBODIMENTS

Figure 1:
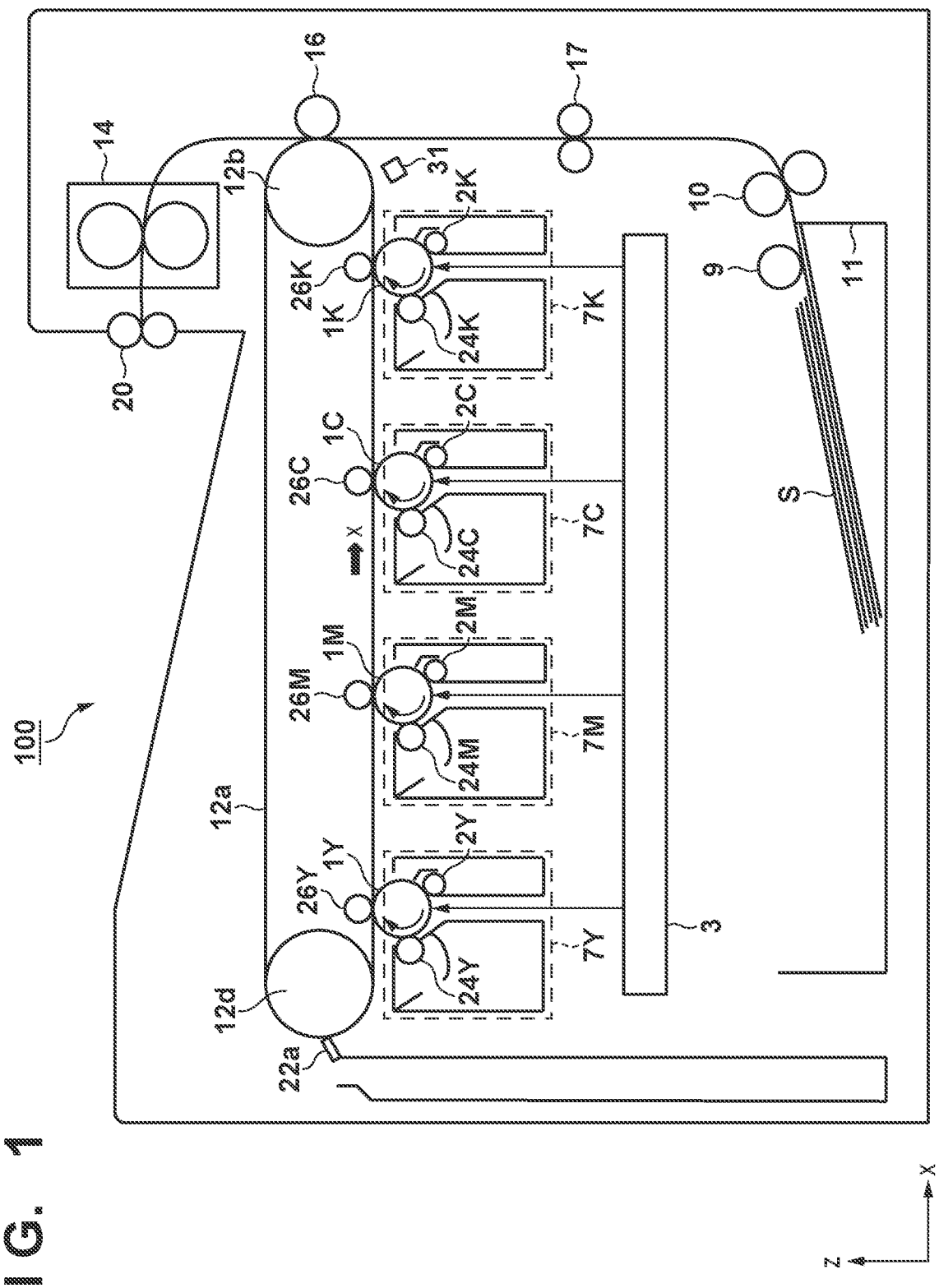
FIG. 1 is a cross-sectional view of an image forming apparatus.

Hereinafter, embodiments will be described in detail with reference to the attached drawings. Note, the following embodiments are not intended to limit the scope of all embodiments. Multiple features are described in the embodiments, but some embodiments do not require all such features, and multiple such features may be combined as appropriate. Furthermore, in the attached drawings, the same reference numerals are given to the same or similar configurations, and redundant description thereof is omitted.

First Embodiment

1. Overall Configuration of Image Forming Apparatus

As illustrated in FIG. 1, an image forming apparatus 100 is an electrophotographic color laser printer. The image forming apparatus 100 includes process cartridges 7Y, 7M, 7C, and 7K, which can be removed from a main body of the image forming apparatus 100. The four process cartridges 7Y, 7M, 7C, and 7K have the same structure, but form images with different colored toners, i.e., yellow (Y), magenta (M), cyan (C), and black (K), respectively. In the following, the letters Y, M, C, and K will be omitted except when referring to each color individually.

Each process cartridge 7 includes a photosensitive drum 1 serving as an image carrier, a charging roller 2 serving as a charger, and a developing roller 24 serving as a developer. The charging roller 2 uniformly charges the surface of the photosensitive drum 1 using a charging voltage. An exposure device 3 forms an electrostatic latent image by irradiating the surface of the photosensitive drum 1 with light corresponding to an image signal. The developing roller 24 uses a developing voltage to develop the electrostatic latent image using toner and form a toner image.

An intermediate transfer unit includes an intermediate transfer belt 12a, a drive roller 12b that drives the intermediate transfer belt 12a, and a driven roller 12d that is rotated by the intermediate transfer belt 12a. Although the intermediate transfer belt 12a is an endless belt-type intermediate transfer body, a drum-type intermediate transfer body may be used instead. A primary transfer roller 26 is disposed on an inner side of the intermediate transfer belt 12a so as to oppose the photosensitive drum 1. The primary transfer roller 26 transfers the toner image formed on the photosensitive drum 1 onto the intermediate transfer belt 12a using a primary transfer voltage. A multicolor toner image formed by the overlapping transfer of the four color toner images onto the intermediate transfer belt 12a is transported to a secondary transfer roller 16 by the intermediate transfer belt 12a rotating.

A paper feed roller 9 feeds a sheet S from a paper feed cassette 11, which holds the sheet S, to a transport path. A transport roller pair 10 transports the fed sheet S to a resist roller pair 17. The resist roller pair 17 transports the sheet S transported from the feed device to the secondary transfer roller 16. The secondary transfer roller 16 transfers the toner image on the intermediate transfer belt 12a onto the sheet S which has been transported thereto. A fixing device 14 fixes the toner image onto the surface of the sheet S. A paper discharge roller pair 20 discharges the sheet S onto which the toner image has been fixed.

A cleaning blade 22a is a cleaning member that cleans off toner remaining on the intermediate transfer belt 12a. An optical sensor 31 is an optical sensor that detects a test image formed on the intermediate transfer belt 12a. The test image can include a pattern for adjusting the position at which each of the YMCK toner images is formed, a pattern for adjusting the density (tone) and color of the toner images, and the like.

2. Calibration of Image Forming Apparatus

Registration control and density control are examples of calibration performed having formed a test pattern on the intermediate transfer belt 12a. "Registration control" refers to adjusting the image forming position. This reduces color shifts. "Density control" refers to controlling the density of the toner image. This improves the color reproduction.

Figure 2:
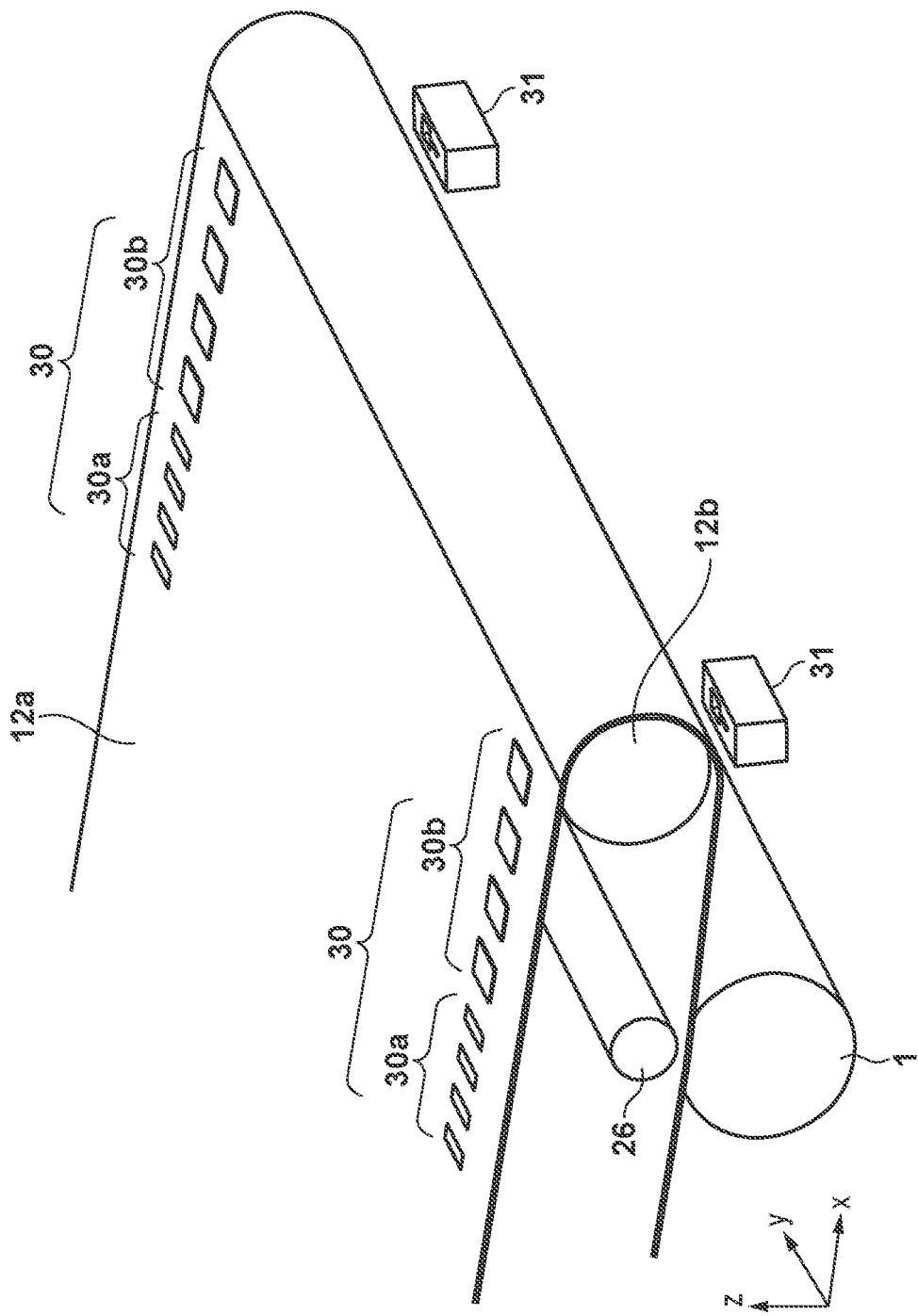
FIG. 2 is a diagram illustrating a test pattern.

As illustrated in FIG. 2, the image forming apparatus 100 performs calibration during a period when the image forming apparatus 100 is not forming an image input by a user. The image forming apparatus 100 forms a test pattern 30 on the intermediate transfer belt 12a and optically detects the test pattern 30 using the optical sensor 31. In this example, two optical sensors 31 are disposed so as to oppose the drive roller 12b of the intermediate transfer belt 12a. The two optical sensors 31 are disposed at different positions in a width direction of the intermediate transfer belt 12a. A direction parallel to this width direction may be defined as a "y direction". A rotation axis of the drive roller 12b is also parallel to the y direction. A movement direction of the intermediate transfer belt 12a may be defined as an "x direction". A direction perpendicular to both the x direction and the y direction may be defined as a "z direction". Three or more of the optical sensors 31 may be disposed as well.

The test pattern 30 has a toner pattern 30a for registration control and a toner pattern 30b for density control. The toner pattern 30a is formed so as to be slanted relative to a transport direction. This is because doing so is favorable for detecting an amount of color shift and an amount of magnification shift. The toner pattern 30b is formed for each of the Y, M, C, and K colors and has a plurality of density patterns, from 0% to 100%.

3. Registration Control

Figure 3:
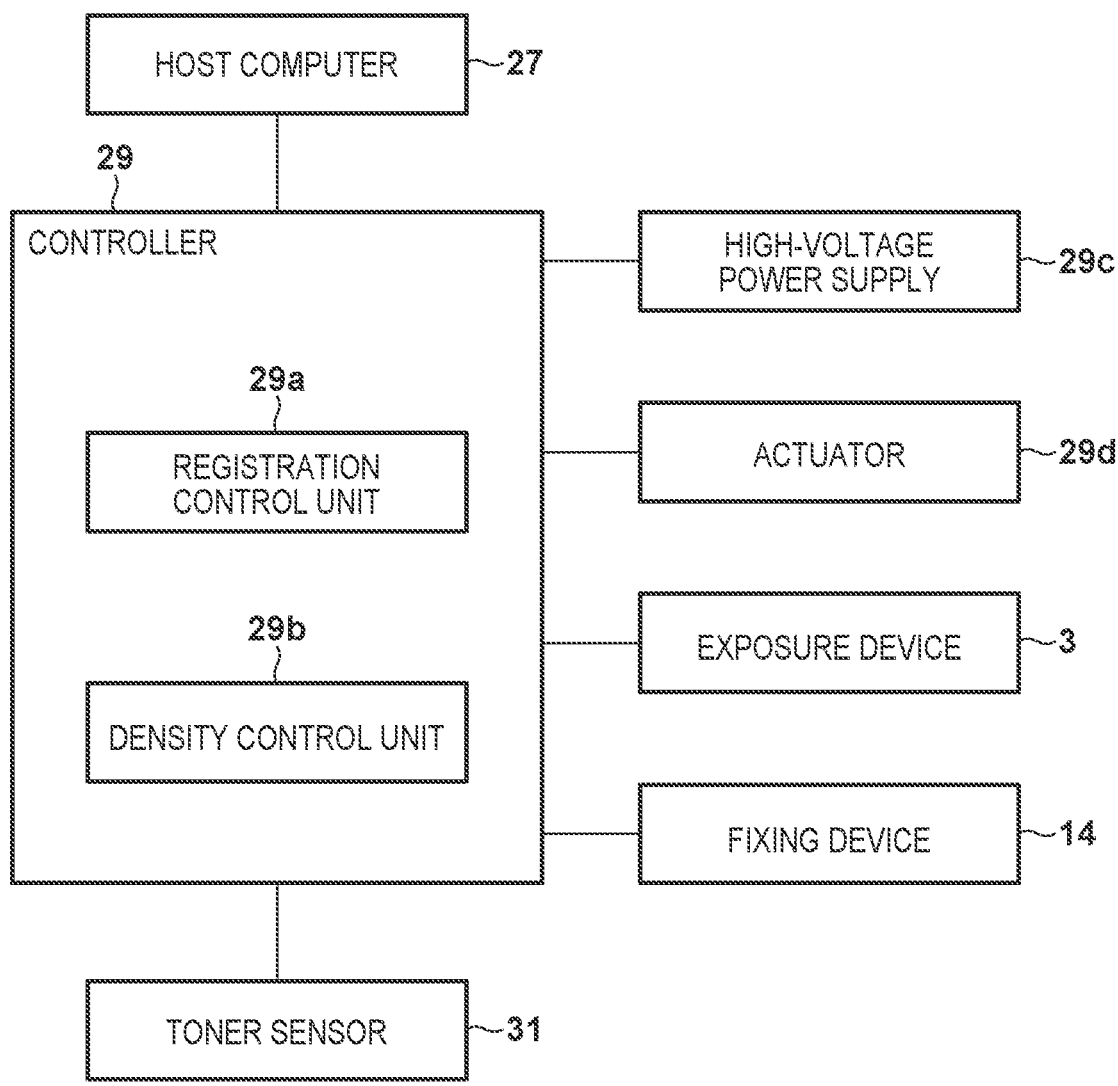
FIG. 3 is a diagram illustrating a controller.

As illustrated in FIG. 3, a controller 29 is a control circuit that comprehensively controls the image forming apparatus 100, and may include, for example, a storage device and a central processing unit (CPU). The controller 29 includes a registration control unit 29a that executes the registration control and a density control unit 29b that executes the density control of the toner image.

The registration control unit 29a controls the exposure device 3 so that a scanning speed of the exposure device 3 is a predetermined target value and an exposure light amount is a predetermined target value. The registration control unit 29a furthermore adjusts an exposure start timing of the exposure device 3 on the basis of a result of the optical sensors 31 detecting the test pattern 30. As a result, the position at which each of the Y, M, C, and K images is formed is adjusted, which corrects color shift. The adjustment of the image forming position includes adjustment of the position of the toner image in a main scanning direction, the position in a sub scanning direction, and the width (magnification) of the toner image in the main scanning direction.

The registration control unit 29a controls the image forming apparatus 100 to form, on the intermediate transfer belt 12a, a test pattern 30 for detecting color shift for each color, the test pattern 30 having i rows. i is an integer of 2 or more. The registration control unit 29a uses i optical sensors 31 to detect the test pattern 30 and obtain the amount of color shift. The "amount of color shift" is a relative amount of color shift in the main scanning direction, a relative amount of color shift in the sub scanning direction, a magnification in the main scanning direction, a relative tilt, and so on between each color. On the basis of the detection results, the registration control unit 29a corrects a writing timing (exposure start timing) of the image for each color so as to reduce the relative amount of color shift for each color.

4. Toner Image Density Control

The density of a toner image may fluctuate depending on the temperature and humidity conditions of the environment in which the image forming apparatus 100 is installed, the extent to which the image forming station for each color has been used, and the like. To correct such fluctuation, the density control unit 29b controls the image forming apparatus 100 to form the test pattern 30 for density detection on the intermediate transfer belt 12a. The density control unit 29b detects the density of the test pattern 30 using the optical sensors 31 and controls density factors on the basis of a result of the detection to obtain desired density characteristics.

Specifically, the density control unit 29b controls a high-voltage power supply 29c to set density factors, such as charging voltage, developing voltage, and exposure light amount, to specific values, and starts forming the test pattern 30. Image data for forming the test pattern 30 may be generated by a host computer 27 or by the controller 29. The density control unit 29b stores the density factor adjustment results in memory or the like and uses the adjustment results when forming an image input by the user on the sheet S.

5. Configuration of Intermediate Transfer Belt

Figure 4A:
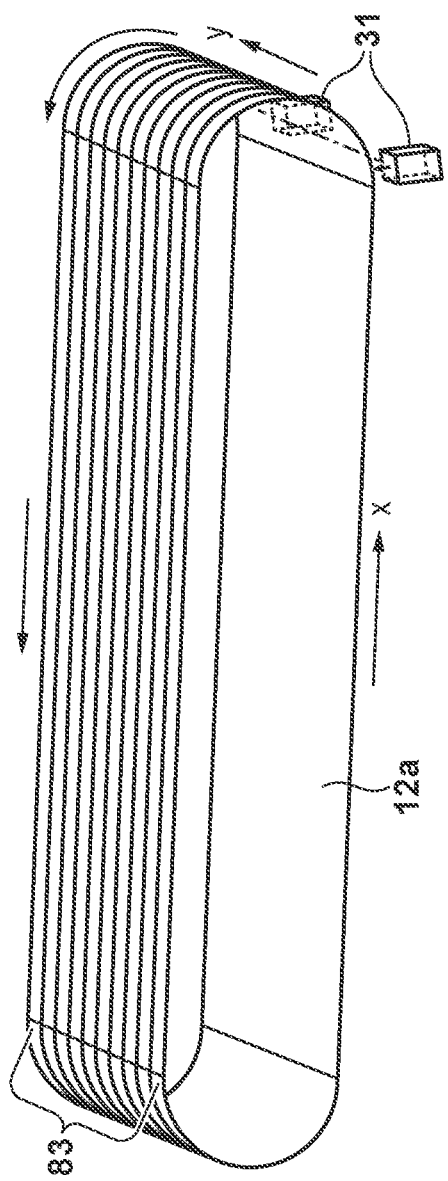
FIGS. 4A and 4B are diagrams illustrating grooves in an intermediate transfer belt.
Figure 4B:
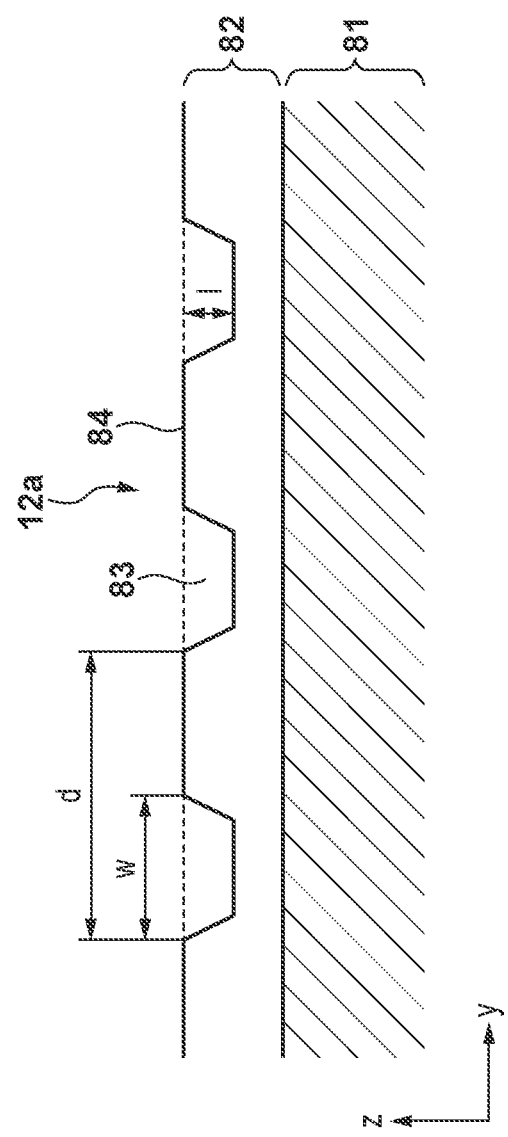

As illustrated in FIG. 4A, a plurality of grooves 83 for reducing friction against the cleaning blade 22a, which is formed from a material such as urethane rubber, may be formed in the intermediate transfer belt 12a. FIG. 4B is a cross-sectional view of the intermediate transfer belt 12a cut parallel to a zy plane.

As illustrated in FIG. 4A, the fine grooves 83 are formed substantially parallel to the x direction. As illustrated in FIG. 4B, the intermediate transfer belt 12a includes a base layer 81 and a surface layer 82 formed on the base layer 81. The base layer 81 is the thickest layer among the plurality of layers constituting the intermediate transfer belt 12a. The surface layer 82 constitutes the surface (outer circumferential surface) of the intermediate transfer belt 12a and carries the toner transferred from the photosensitive drum 1.

The base layer 81 may be, for example, a layer, approximately 70 μm thick, constituted by polyethylene naphthalate resin with carbon black dispersed and mixed therein as an electrical resistance modifier. Polyethylene naphthalate resin is merely one example of the material of the base layer 81, and any thermoplastic resin can be used. Materials such as polyimide, polyester, polycarbonate, polyacrylate, acrylonitrile-butadiene-styrene copolymer (ABS), polyphenylene sulfide (PPS), polyvinylidene fluoride (PVdF), and mixtures of such resins can be used. In addition to electronic conductive agents, an ionic conductive agent, for example, may be used as the electrical resistance modifier (conductive agent).

The surface layer 82 may be a layer, approximately 3 μm thick, constituted by an acrylic resin with an electrical resistance modifier (e.g., zinc oxide) dispersed and mixed therein. From the viewpoint of strength, such as resistance to wear and resistance to cracking, a resin material (a curable resin) may be used as the material of the surface layer 82. Among curable resins, for example, acrylic resins obtained by curing acrylic copolymers containing unsaturated double bonds may be used. In addition to electronic conductive agents, an ionic conductive agent, for example, may be used as the electrical resistance modifier (conductive agent).

In general, the combination of urethane rubber and acrylic resin has high frictional resistance due to sliding. As a result, the cleaning blade 22a is prone to being bent back, wear due to repeated use, and so on. The surface of the intermediate transfer belt 12a may be processed to have a fine uneven shape in order to reduce friction. For example, an average interval d of the plurality of grooves 83 in the y direction may be greater than or equal to 2 μm and less than or equal to 10 μm. The grooves 83 may be referred to as "groove shapes" or "groove parts". The grooves 83 are provided in substantially the entirety of the outer circumferential surface of the intermediate transfer belt 12a. In the y direction, the plurality of grooves 83 are formed in substantially the entirety of a contact region where the cleaning blade 22a and the intermediate transfer belt 12a contact each other. The grooves 83 may not be provided in regions of the surface layer 82 of the intermediate transfer belt 12a that do not come into contact with the cleaning blade 22a.

Grinding, cutting, imprinting, and the like are generally employed as techniques to form fine uneven shapes. Any processing technique that enables the desired interval d to be obtained can be used. From the viewpoint of processing cost, productivity, and the like, an imprinting process that takes advantage of the light-curing properties of acrylic resin, which is the base material of the surface layer 82, may be used.

A width of each of the grooves 83 (a groove width) w is the width of an opening in the y direction, which is substantially orthogonal to a longitudinal axis direction of the grooves 83. The groove width w is the distance of a section where the surface layer 82 is relatively thin. The surface layer 82 is thickest at an uppermost surface 84. The groove width w is, for example, 1.2 μm. The groove width w may be lower than the average particle diameter of the toner. To be more specific, the groove width w may be lower than half the average particle diameter of the toner. Having the groove width w be smaller than the average particle diameter of the toner makes it more difficult for the toner to enter the grooves 83, and the toner is therefore more reliably cleaned by the cleaning blade 22a. To suppress collapsing of convex portions of the mold used to form the grooves 83, the groove width w may be set to greater than or equal to 0.5 μm, for example. More specifically, the groove width w may be set to be greater than or equal to 0.5 μm and less than or equal to 6 μm. Furthermore, the groove width w may be set to be greater than or equal to 1 μm and less than or equal to 2 μm.

A depth of each of the grooves 83 (a groove depth) l is defined as a depth from the opening of the groove 83 (the uppermost surface 84) to a bottom part of the groove 83 in a thickness direction of the intermediate transfer belt 12a. For example, the groove depth l is 0.45 μm at the initial stage of use of the intermediate transfer belt 12a (when the belt is new). The groove depth l may, for example, be greater than or equal to 0.2 μm and less than the thickness of the surface layer 82 at the initial stage of use of the intermediate transfer belt 12a. If the groove depth l is too small, it is easy for the grooves 83 to disappear or for cleaning problems to occur due to the surface layer 82 being worn down. Having the groove depth l be less than the thickness of the surface layer 82 ensures that the grooves 83 do not reach the base layer 81, and are only present on the surface layer 82. The surface layer 82 may be designed so that the thickness thereof is greater than or equal to 1 μm and less than or equal to 5 μm, from the viewpoint of reducing a loss of durability due to the layer being too thin, and reducing cracking of the surface layer due to the layer being too thick. More typically, the thickness of the surface layer 82 is set to be greater than or equal to a thickness at which the grooves 83 do not reach the base layer 81, and less than or equal to 3 μm. To keep the friction coefficient to less than or equal to 0.6, the interval d is set to be less than or equal to 5 μm. From the viewpoint of the manufacturing precision of the grooves 83, greater than or equal to 2 μm is required.

The interval d between the grooves 83 is defined as the distance from one end of the opening of a jth groove 83 in the y direction (e.g., a left end) to one end of the opening of a j+1th groove 83 in the y direction (e.g., a left end). j is an integer of 1 or more. The plurality of grooves 83 are formed at an equal pitch of 3.7 μm across substantially the entirety of the y direction (i.e., at a constant interval d). The interval d may be defined based on a right end of the opening, or as the interval between the bottom parts of two adjacent grooves 83. If the interval d is too small, it may be difficult to form a consistent uneven shape. If, however, the interval d is too large, it may be difficult to suppress wear on the cleaning blade 22a. Accordingly, the interval d may be set to be greater than or equal to 2 μm and less than or equal to 10 μm, and more specifically, greater than or equal to 3 μm and less than or equal to 6 μm.

Figure 5A:
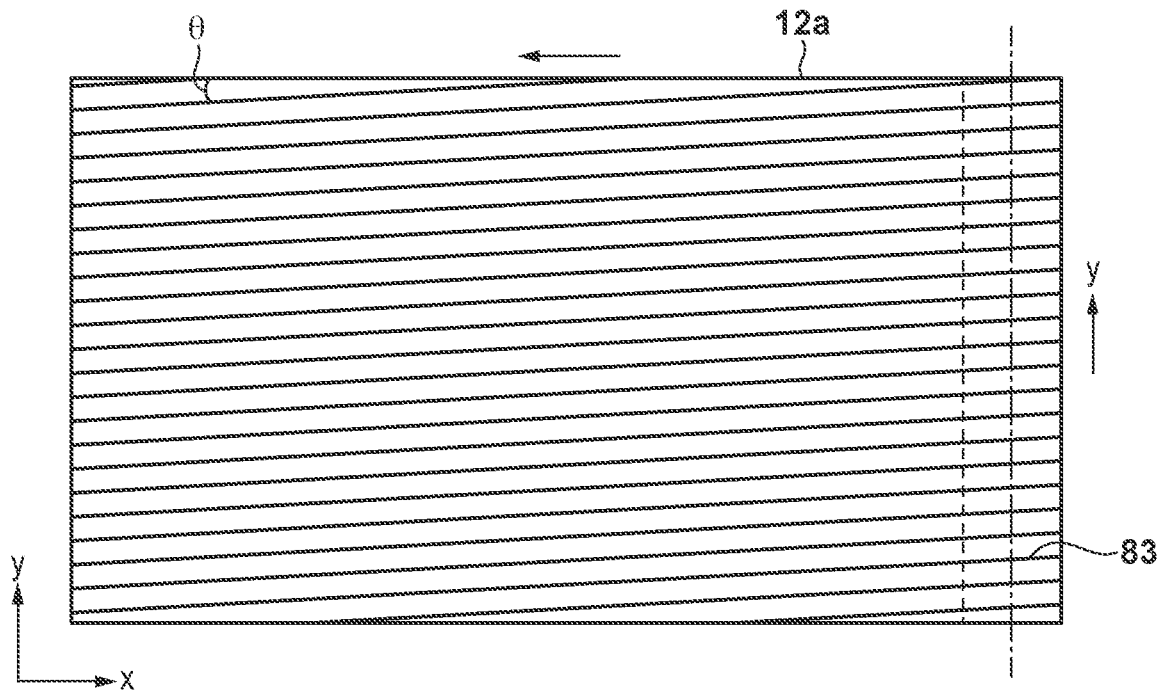
FIGS. 5A and 5B are diagrams illustrating grooves in the intermediate transfer belt.

In FIG. 4A, the grooves 83 are formed substantially parallel with the y direction. Furthermore, the grooves 83 are formed in continuous, substantially straight lines in the circumferential direction (rotational direction) of the intermediate transfer belt 12a. However, the grooves 83 may extend in any direction that is parallel to a direction intersecting with the y direction. As illustrated in FIG. 5A, the direction in which the grooves 83 extend may be at an angle to the transport direction of the intermediate transfer belt 12a. This angle θ is, for example, less than or equal to 45 degrees, and more specifically, less than or equal to 10 degrees. Typically, θ can be set to substantially zero. The grooves 83 having the angle θ may be formed using a mold having a convex portion formed at an angle to the rotational direction of a cylinder that forms the mold. The grooves 83 may be formed by holding the mold, which has a convex portion formed substantially parallel to the rotational direction of the cylinder that forms the mold, at an angle relative to the x direction.

6. Diffraction Phenomenon

Figure 5B:
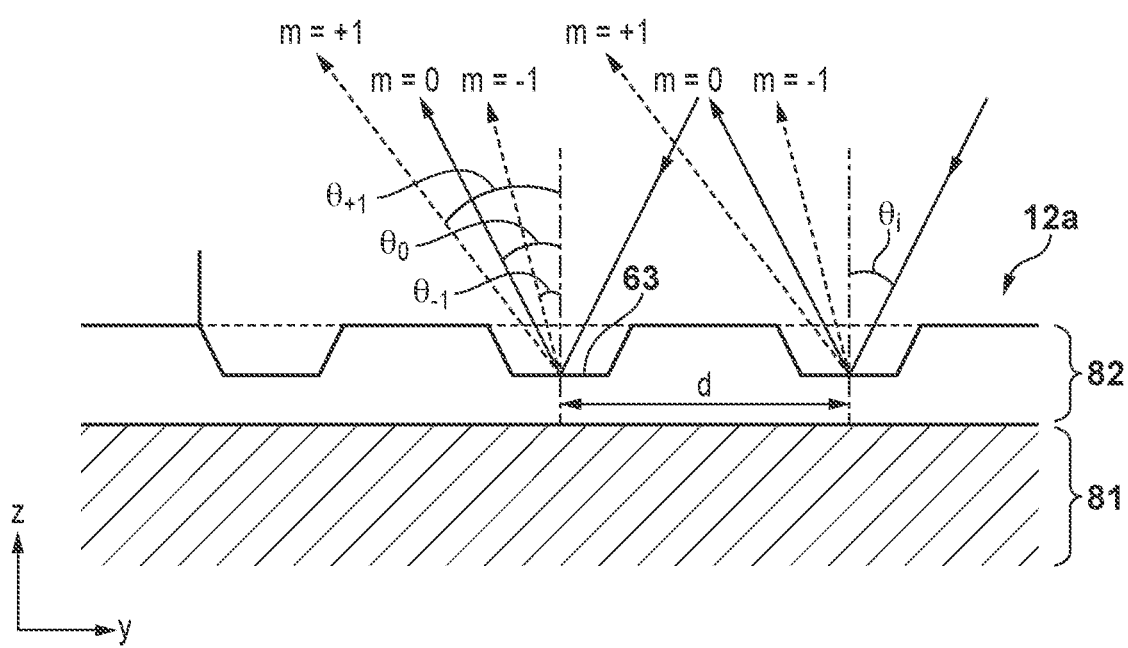

FIG. 5B illustrates a diffraction phenomenon caused by a reflective diffraction grating. In general, the equation for finding a diffraction angle from a reflective diffraction grating is expressed by Equation 1 below.

$$d[\sin(\theta i)+\sin(\theta m)]=m\lambda \quad \text{Equation 1}$$

d represents the diffraction grating interval. λ represents the wavelength of the light ray. θi represents the incident angle of the light ray with respect to the normal direction of the diffraction grating. θm represents the reflection angle (diffraction angle). m represents the diffraction order (a positive or negative integer of m=±0, ±1, ±2, and so on). When m=0 (i.e., regular reflection), θi=θm=0. Accordingly, for regularly-reflected light, the grating interval d and the light ray wavelength λ do not affect the diffraction angle. For other orders, depending on the interval d and the light ray wavelength λ, instances of reflected light intensify each other at a diffraction angle θm such that an optical path difference between the instances of reflected light is an integral multiple of the wavelength. Expanding Equation 1 for the diffraction angle θm results in Equation 2 below.

$$\sin\theta m=m\lambda/d-\sin\theta i \quad \text{Equation 2}$$

The following trends occur when the incident angle relative to the normal line of a target surface to be irradiated is defined as negative (minus). However, the incident angle may also be defined as m>0.

The greater the absolute value of the incident angle θi is, the greater the right-hand side of Equation 2 becomes, and the greater the diffraction angle θm becomes.

The greater the light ray wavelength λ is, the greater the right-hand side of Equation 2 becomes, and the greater the diffraction angle θm becomes.

The smaller the grating interval d is, the greater the right-hand side of Equation 2 becomes, and the greater the diffraction angle θm becomes.

In the intermediate transfer belt 12a, the average interval d of the grooves 83 formed in the surface corresponds to the grating interval d. Accordingly, light from the light-emitting element of the optical sensor 31 is diffracted by the plurality of grooves 83.

7. Scattering Characteristics of Intermediate Transfer Belt

Figure 6:
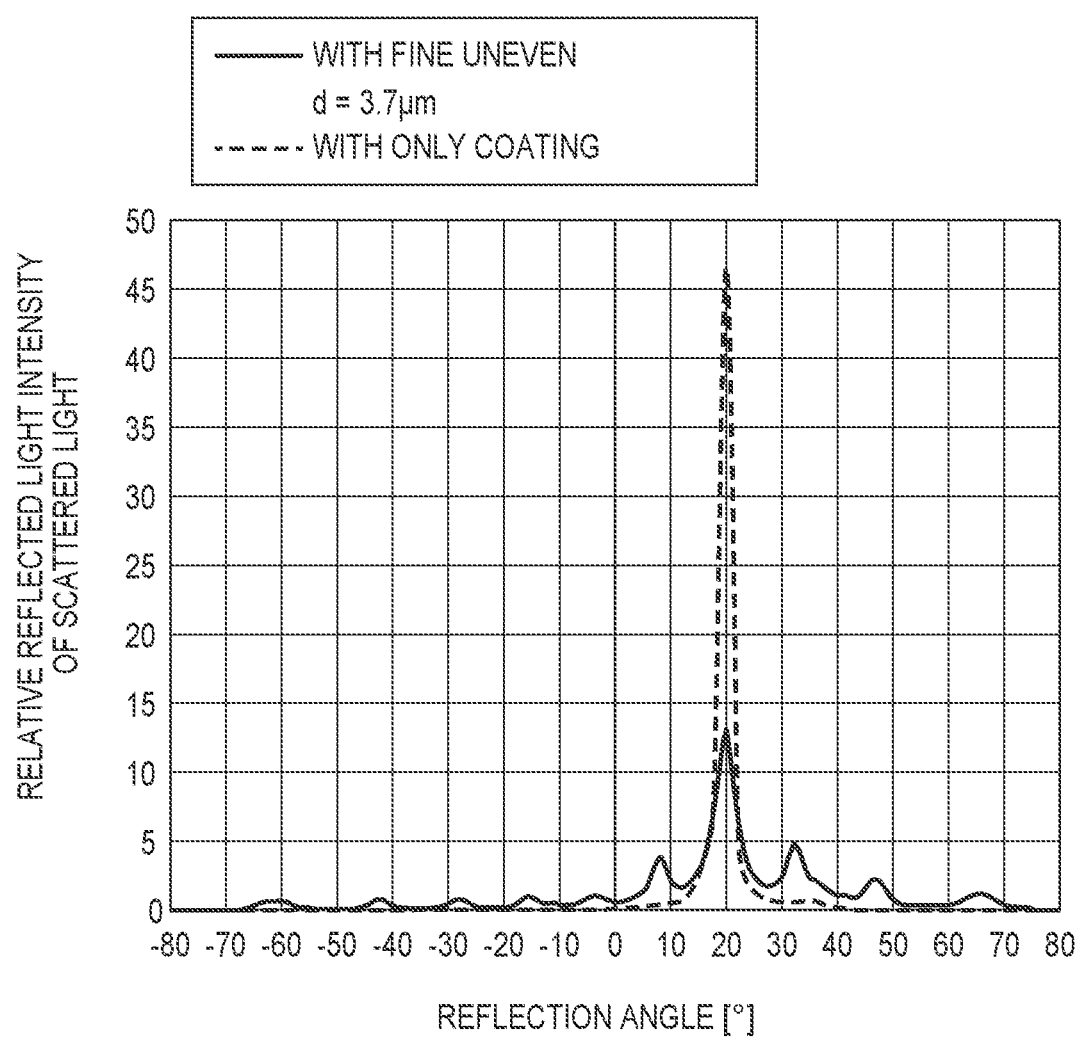
FIG. 6 is a graph illustrating BRDF.

FIG. 6 is a graph showing angular distribution characteristics of scattered light (hereinafter referred to as "BRDF", an acronym for "bi-directional reflectance distribution function"). The vertical axis represents a relative reflected light intensity of the scattered light. The horizontal axis represents a reflection angle. The solid line represents the BRDF obtained by irradiating the surface of the intermediate transfer belt 12a, in which the plurality of grooves 83 (uneven shapes) with an interval d of 3.7 μm are formed, with light of λ=622 nm at an incident angle of −20°. The BRDF is measured using Mini-Diff V1, a compact and simple scattering measurement device manufactured by Cybernet Systems Co., Ltd. In FIG. 6, an intermediate transfer belt 12a having only an acrylic resin coating, with no fine uneven shapes on its surface (hereinafter referred to as a "coated belt"), is used as a comparative example. The broken line represents the BRDF of the comparative example.

As can be seen from FIG. 6, the BRDF of the coated belt has a diffuse reflection component which spreads broadly with respect to the peak of regularly-reflected light. In contrast, with the BRDF of the intermediate transfer belt 12a in which fine uneven shapes are formed, a diffraction phenomenon occurs in which the amount of 0th-order regularly-reflected light is reduced and the amount of reflected light increases at regular angles. The intensity of the diffracted light decreases as the order m increases.

Diffuse reflection components are generated in the vicinity of each order of diffracted light of the BRDF of the intermediate transfer belt 12a, in which uneven shapes are formed. As such, the diffuse reflection component of the BRDF of the intermediate transfer belt 12a, in which uneven shapes are formed, is much stronger than the diffuse reflection component of the BRDF of the coated belt.

Figure 7A:
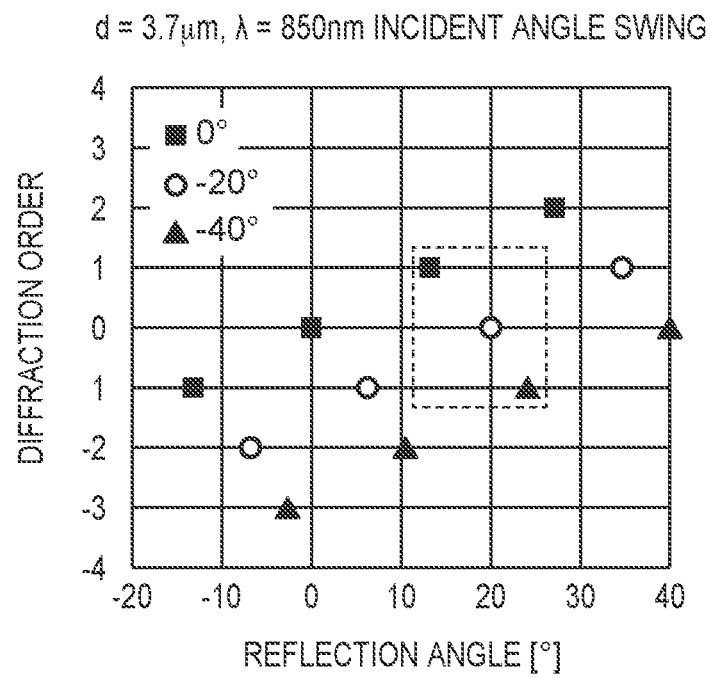
FIGS. 7A and 7B are graphs illustrating a relationship between lattice interval, reflection angle, incident angle, and diffraction order.
Figure 7B:
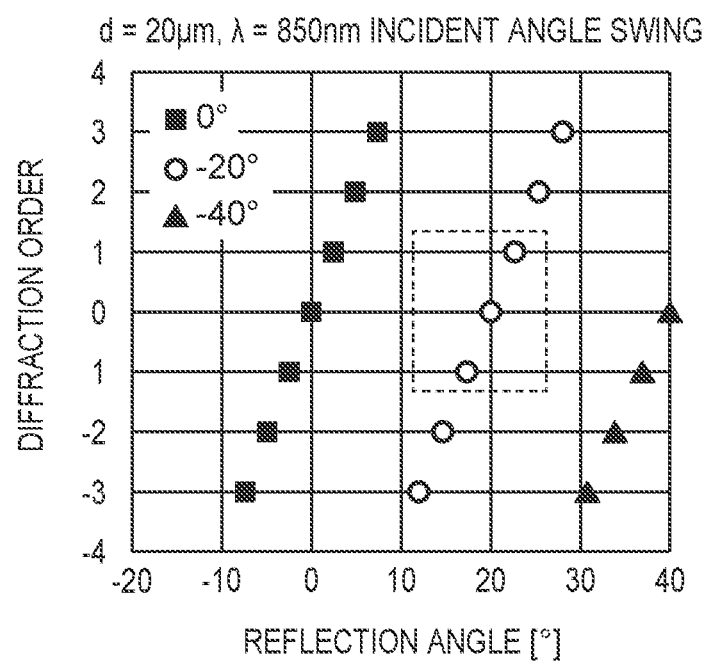

FIGS. 7A and 7B illustrate a relationship between diffraction order and reflection angle calculated using Equation 1. In FIG. 7A, the light ray wavelength λ is 850 nm, the interval d is 3.7 μm, and the incident angles are 0°, −20°, and −40°. In FIG. 7B, the light ray wavelength λ is 850 nm, the interval d is 20 μm, and the incident angles are 0°, −20°, and −40°.

Here, it is assumed that the range indicated by the broken line is set as a light-receiving range for regularly-reflected light by the optical sensor 31. At d=3.7 μm, diffracted light at an incident angle of 0° and a diffraction order of +1, and diffracted light at an incident angle of −40° and a diffraction order of −1, enter the light-receiving range of regularly-reflected light at an incident angle of −20°. On the other hand, at d=20 μm, the diffracted light of +1st order and the diffracted light of −1st order, which are at an incident angle of −20°, enter the light-receiving range of the regularly-reflected light at an incident angle of −20°. However, diffracted light originating from light rays at different incident angles will not enter the light-receiving range.

When the interval d is smaller than 20 μm, diffracted light originating from light rays at different incident angles can enter the light-receiving range. However, as the diffraction order of the diffracted light rises, the optical intensity of the diffracted light drops, and the reception of regularly-reflected light is therefore less likely to be affected.

Based on the foregoing, when the interval d of the grooves 83 is small, it is easier for diffracted light for different incident angles to enter the light-receiving range of the regularly-reflected light from the surface (substrate) of the intermediate transfer belt 12a. However, diffracted light at different incident angles does not enter the light-receiving range of diffused reflection light from the toner image. This is because the grooves 83 are obscured by toner and the diffraction phenomenon therefore does not occur. In this manner, the detection accuracy of the optical sensor 31 can drop with a target to be measured where error is likely to arise only in one of the result of detecting regularly-reflected light from the substrate and the result of detection from the test pattern 30.

The actual light-receiving range of the optical sensor 31 may not be as broad as the light-receiving range illustrated in FIGS. 7A and 7B. However, as illustrated in FIG. 6, the diffuse reflection component produced in the vicinity of the diffracted light of each order in the BRDF of the intermediate transfer belt 12a, in which an uneven shape is formed, has a spread. Furthermore, this diffuse reflection component is much stronger than the diffuse reflection component of the BRDF of the coated belt. As such, among the diffracted light at different incident angles, light aside from diffracted light at a peak intensity will affect the detection results.

8. Configuration of Toner Sensor

Figure 8A:
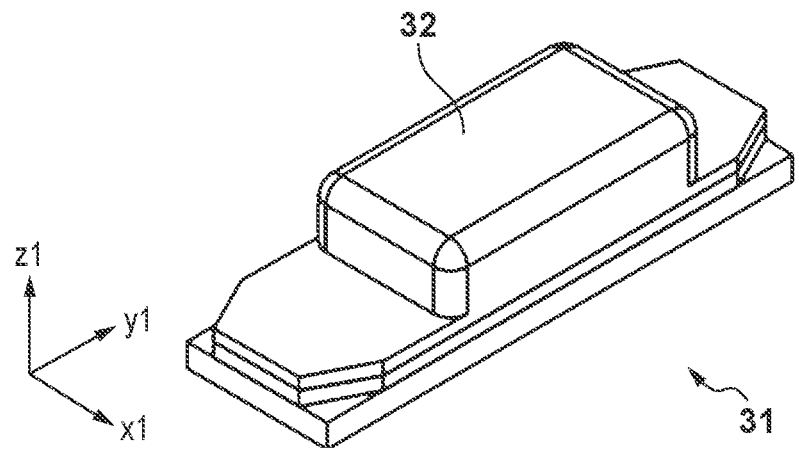
FIGS. 8A and 8B are diagrams illustrating an optical sensor.
Figure 8B:
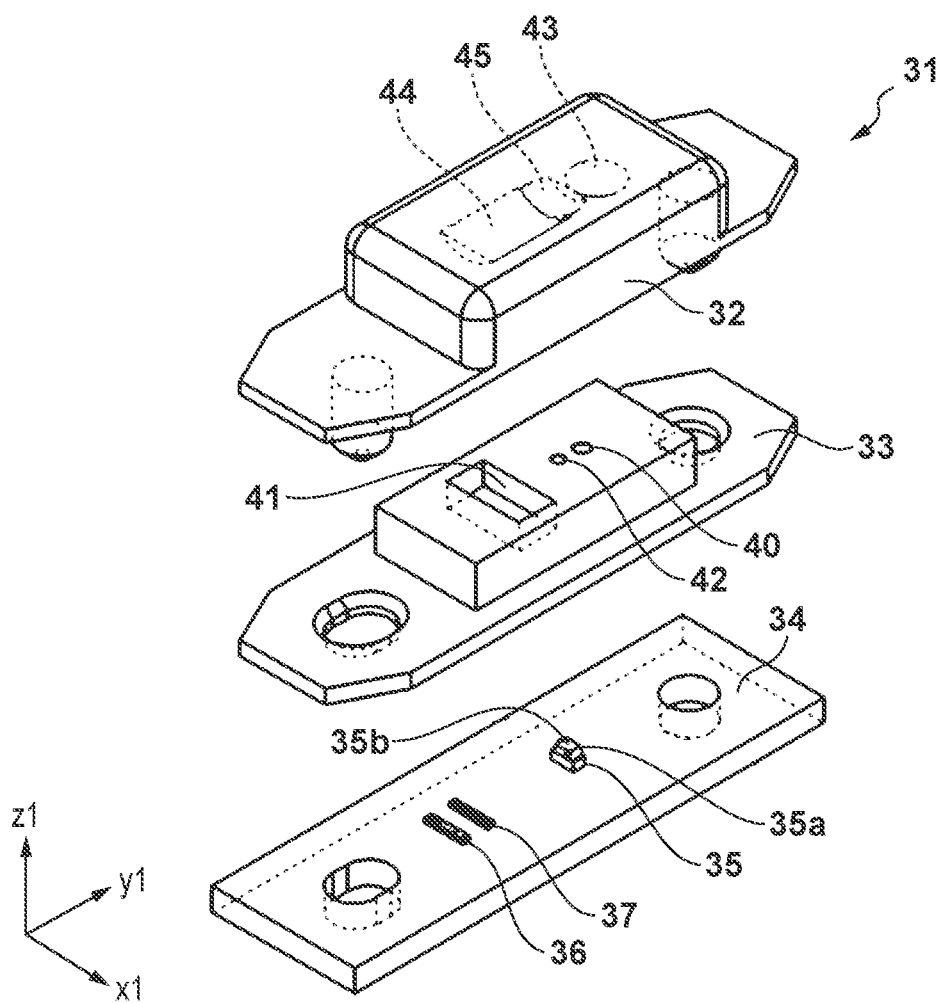

FIG. 8A is a schematic perspective view of the optical sensor 31. FIG. 8B is an exploded perspective view of the constituent components of the optical sensor 31. x, y, and z are directions based on the image forming apparatus 100, while x1, y1, and z1 are directions based on the optical sensor 31. The x1 direction is the shorter direction of the optical sensor 31. Although the x direction and the x1 direction need not be parallel, it is assumed here that the x direction and the x1 direction are parallel. The y1 direction is the longer direction of the optical sensor 31. Here, the y direction and the y1 direction are parallel. The z1 direction is a height direction of the optical sensor 31 (a normal direction of a circuit board 34). Although the z direction and the z1 direction need not be parallel, it is assumed here that the z direction and the z1 direction are parallel.

Figure 9:
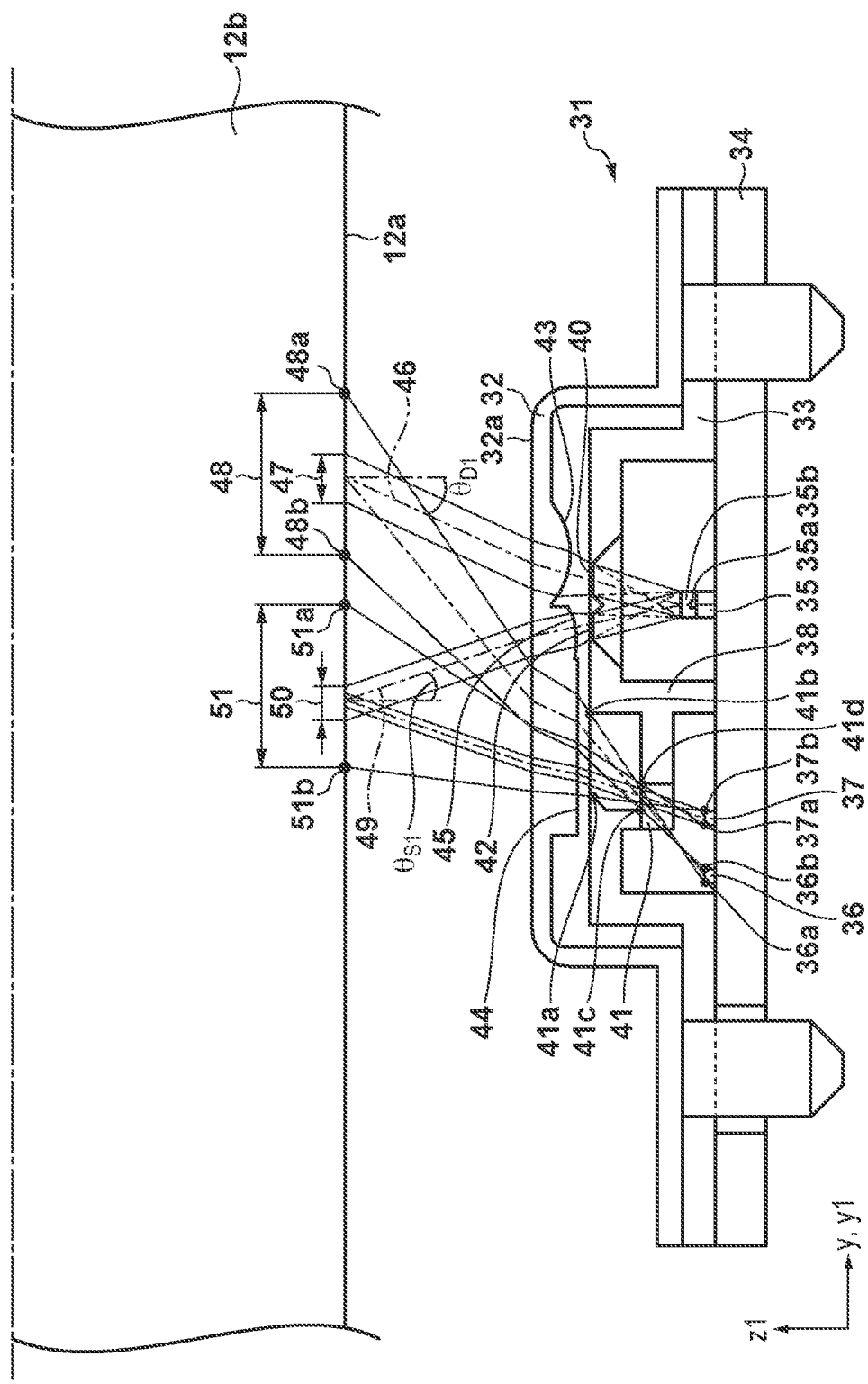
FIG. 9 is a diagram illustrating an optical path of an optical sensor.

FIG. 9 is a cross-sectional view of an optical path taking the x1 direction as a sight direction. In other words, FIG. 9 illustrates a cut plane passing through the rotation axis of the drive roller 12b and the center of an LED 35. The optical sensor 31 is disposed so as to face the surface of a substantially cylindrical shape formed by the intermediate transfer belt 12a wrapping around the drive roller 12b. As illustrated in FIGS. 8A and 8B, the optical sensor 31 includes a cover member 32, a housing 33, and the circuit board 34. The LED 35, which is a light-emitting element, a first light receiving unit 36, and a second light receiving unit 37 are mounted on the circuit board 34. A straight line connecting the center of the mounting position of the LED 35, the center of the mounting position of the first light receiving unit 36, and the center of the mounting position of the second light receiving unit 37 is substantially parallel to the rotation axis of the drive roller 12b.

As illustrated in FIG. 8B, the LED 35 includes a light-emitting chip 35a enclosed within a light transmitting member 35b. The light transmitting member 35b is a member which is light-transmissive (e.g., resin or glass). Light emitted from the light-emitting chip 35a is scattered at a boundary surface of the light transmitting member 35b, and as a result, light is emitted from substantially the entire surface of the light transmitting member 35b. Here, the three-dimensional shape of the light-emitting chip 35a and the three-dimensional shape of the light transmitting member 35b are illustrated as parallelepipeds, respectively. The three-dimensional shape of the light transmitting member 35b may be a semi-dome shape.

Some of the light emitted from the LED 35 is reflected by the surface of the intermediate transfer belt 12a and becomes diffused reflection light, which is detected by the first light receiving unit 36. Some of the light emitted from the LED 35 is reflected by the surface of the intermediate transfer belt 12a and becomes regularly-reflected light, which is detected by the second light receiving unit 37. In other words, the first light receiving unit 36 includes a plurality of light-receiving elements that receive diffused reflection light. Likewise, the second light receiving unit 37 includes a plurality of light-receiving elements that receive regularly-reflected light. The pluralities of light-receiving elements are aligned so as to be parallel to the shorter direction of the circuit board 34 (the x1 direction). For example, 16 of each of the light-receiving elements are provided. By configuring the first light receiving unit 36 and the second light receiving unit 37 with a plurality of light-receiving elements in this manner, the reflected light can be sufficiently detected even if the cylindrical surface of the drive roller 12b and the optical sensor 31 are misaligned within a tolerance range.

As illustrated in FIG. 8B, a first opening 40, a second opening 41, and a third opening 42 are provided in a top surface of the housing 33. The first opening 40 forms part of a light guide path through which the light from the LED 35 to the intermediate transfer belt 12a passes. The second opening 41 forms part of a light guide path through which the reflected light from the intermediate transfer belt 12a to the first light receiving unit 36 and the second light receiving unit 37 passes. The third opening 42 forms part of a light guide path through which the light from the LED 35 to the intermediate transfer belt 12a passes. The housing 33 may be provided with a light-shielding wall 38. The light-shielding wall 38 prevents light from the LED 35 from being directly incident on the first light receiving unit 36 and the second light receiving unit 37.

A first lens unit 43, a second lens unit 44, and a third lens unit 45 may be provided on a rear side of the cover member 32 (the side where the housing 33 is disposed). The first lens unit 43 functions so that the light passing through the first opening 40 forms a desired spot on the target surface to be irradiated. The second lens unit 44 functions so that the diffused reflection light from the intermediate transfer belt 12a forms an image on the first light receiving unit 36 and the regularly-reflected light from the intermediate transfer belt 12a forms an image on the second light receiving unit 37. The third lens unit 45 functions so that the light passing through the third opening 42 forms a desired spot on the target surface to be irradiated. The first lens unit 43, the second lens unit 44, and the third lens unit 45 may be provided as individual units, or may be provided as a single integrated unit.

9. Optical Path for Detecting Diffused Reflection Light

In FIG. 9, the y direction and the y1 direction are parallel to the width direction of the intermediate transfer belt 12a. Accordingly, the direction in which the grooves 83 extend is parallel to the depth direction of the drawing. As illustrated in FIG. 9, the light output from the LED 35 passes through the first opening 40 and is incident on the first lens unit 43. The light incident on the first lens unit 43 passes through a flat part 32a, which is part of the top surface of the cover member 32, and is incident on the surface of the intermediate transfer belt 12a. This incident light will be referred to as first irradiation light 46. As illustrated in FIG. 9, a first irradiated region 47 is a region irradiated with the first irradiation light 46 in order to detect diffused reflection light.

The housing 33 is constituted by a black resin. This reduces stray light. The cover member 32 is constituted by a transparent resin (a resin which transmits light). The refractive index of the cover member 32 is different from the refractive index of spaces in front of and behind the cover member 32. As such, the first irradiated region 47 is irradiated with the first irradiation light 46 after the first irradiation light 46 has been refracted by the surface of the first lens unit 43 and the flat part 32a. The material of the cover member 32 is set to, for example, polystyrene having a refractive index of 1.59. The lens radius of the first lens unit 43 is designed so that the light-emitting chip 35a is disposed at the focal point of the first lens unit 43. As such, the first irradiation light 46 incident on the first lens unit 43 becomes substantially parallel light with which the intermediate transfer belt 12a is irradiated.

As illustrated in FIG. 9, the first opening 40 and the first lens unit 43 are disposed at positions shifted to the right (the +y1 direction) of a vertical line extending from the LED 35 to the rotation axis of the drive roller 12b. Note that the vertical line is parallel to the normal line of the circuit board 34. The first irradiation light 46 is also a light ray which advances in a direction slanted to the right relative to this vertical line. As illustrated in FIG. 9, an irradiation angle θD1 is defined here. The irradiation angle θD1 of the first irradiation light 46 is −25°, for example. Although the irradiation angle is defined as negative and the reflection angle is defined as positive here, the positive and negative signs will be omitted when focusing on the magnitudes of the angles.

As illustrated in FIG. 9, a first light-receiving region 48, which is a range in which the first light receiving unit 36 can receive reflected light, is a range extending from a point 48a to a point 48b. The point 48a is a point obtained by extending a line connecting a left corner 36a of the first light receiving unit 36 and an upper-right corner 41b of the second opening 41 along the light guide path. The point 48b is a point obtained by extending a line connecting a right corner 36b of the first light receiving unit 36 and a lower-left corner 41c of the second opening 41 along the light guide path.

As illustrated in FIG. 9, the first irradiated region 47 is smaller than the first light-receiving region 48. As such, the detection range of the first light receiving unit 36 actually corresponds to the first irradiated region 47. In other words, the first light receiving unit 36 for detecting diffused reflection light detects diffused reflection light from the first irradiated region 47.

10. Optical Path for Detecting Regularly-Reflected Light

As illustrated in FIG. 9, the third opening 42 is provided in the housing 33 for the purpose of irradiating the intermediate transfer belt 12a with light. Additionally, the third lens unit 45 is provided in the cover member 32 for the purpose of irradiating the intermediate transfer belt 12a with light separately from the first lens unit 43. The light output from the LED 35 passes through the third opening 42 and is incident on the third lens unit 45. The light incident on the third lens unit 45 passes through the flat part 32a provided in the top surface of the cover member 32 and is incident on the surface of the intermediate transfer belt 12a. This incident light will be referred to as second irradiation light 49. A second irradiated region 50 is a region irradiated with the second irradiation light 49 in order to detect regularly-reflected light. The lens radius of the third lens unit 45 is designed so that the light-emitting chip 35a is disposed at the focal point of the third lens unit 45. As such, the second irradiation light 49 incident on the third lens unit 45 becomes substantially parallel light with which the intermediate transfer belt 12a is irradiated.

As illustrated in FIG. 9, the third opening 42 and the third lens unit 45 are disposed at positions shifted to the left (the −y direction) of the aforementioned vertical line for the LED 35. In FIG. 9, the second irradiation light 49 is a light ray slanted to the left relative to this vertical line. Here, the irradiation angle of the second irradiation light 49 is defined as θS1. The irradiation angle θS1 of the second irradiation light 49 is, for example, −19.1°.

As illustrated in FIG. 9, a second light-receiving region 51, which is a range in which the second light receiving unit 37 can receive reflected light, is a range extending from a point 51a to a point 51b. The point 51a is a point obtained by extending a line connecting a left corner 37a of the second light receiving unit 37 and a lower-right corner 41d of the second opening 41. The point 51b is a point obtained by extending a line connecting a right corner 37b of the second light receiving unit 37 and an upper-left corner 41a of the second opening 41.

As illustrated in FIG. 9, the dimensions of the second irradiated region 50 are smaller than the dimensions of the second light-receiving region 51. As a result, the substantial range over which the second light receiving unit 37 can detect light is the second irradiated region 50. In other words, the second light receiving unit 37 detects regularly-reflected light from the second irradiated region 50.

11. Diffracted Light from Toner Sensor Irradiation Light

FIG. 10 illustrates an optical path of diffracted light of the first irradiation light 46, seen from the downstream side of the transport direction of the intermediate transfer belt 12a. FIG. 11 illustrates an optical path of diffracted light of the second irradiation light 49, seen from the downstream side of the transport direction of the intermediate transfer belt 12a. The interval d of the grooves 83 of the intermediate transfer belt 12a is 3.7 μm, and a wavelength λ of the LED 35 is 850 nm. A distance between the intermediate transfer belt 12a and the circuit board 34 of the optical sensor 31 is 11.5 mm A distance between the intermediate transfer belt 12a and the flat part 32a of the cover member 32 is 5.5 mm.

The diffraction angle of the diffracted light produced by the second irradiation light 49, illustrated in FIG. 11, can be calculated by substituting θS1 (θS1=−19.1°) for the irradiation angle θi in Equation 2. When the diffraction angles are calculated for m=−1, 0, and +1, the diffraction angles indicated in FIG. 12B are obtained.

As can be seen from the diffracted light ray indicated in FIG. 11, when the range which can be detected by the second light receiving unit 37 is limited to the second irradiated region 50 in the optical sensor 31, it is difficult for high-intensity low-order (±1st order) diffracted light to be incident on the second light receiving unit 37. As illustrated in FIGS. 9 and 11, the third opening 42 is a light emission opening of a through-hole (light guide path) passing through the housing 33. Furthermore, the through-hole has a substantially cone or tapered shape. As one example, an inclined surface of the through-hole is 30° relative to a horizontal plane (a plane parallel to the surface of the circuit board 34). The depth of the through-hole is, for example, 0.2 mm Thinning the light guide path in this manner makes it possible to restrict the incident angle of the second irradiation light 49 on the second irradiated region 50. In other words, although the parallel light from the LED 35 is incident as second irradiation light 49, wall-reflected light produced by reflection from the wall surface of the third opening 42 is less likely to be produced. When wall-reflected light is less likely to be produced, the second irradiated region 50 (spot radius) is less likely to expand.

The diffracted light produced by the first irradiation light 46 detected by the first light receiving unit 36 is calculated by substituting θD1 for the irradiation angle θi in Equation 2 (θD1=−25°). As illustrated in FIGS. 10 and 12A, the orders of the diffracted light which are to be incident near the first light receiving unit 36 are the −6th, −5th, and −4th orders. In particular, −5th order diffracted light can be incident on the first light receiving unit 36. The amount of diffused reflection light is low compared to regularly-reflected light, and the amount of higher-order diffracted light is low as well. Accordingly, the optical sensor 31 according to the present embodiment is less susceptible to the effects thereof.

12. Comparison of Optical Sensor Detection Performance

Figure 13:
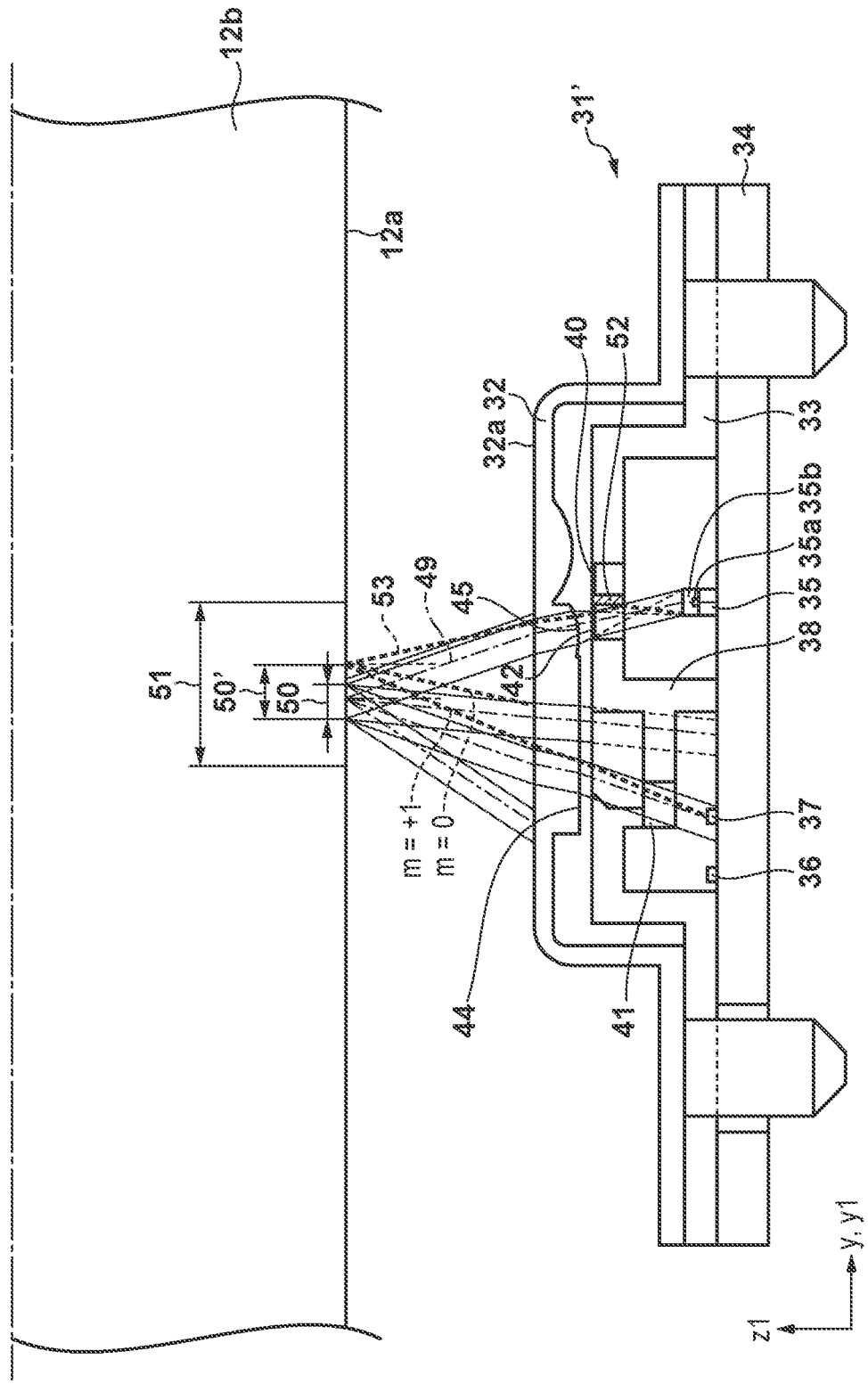
FIG. 13 is a diagram illustrating diffracted light of various orders according to a comparative example.

FIG. 13 illustrates an example of an optical sensor 31' according to a comparative example. Aside from the shape of the housing 33, the optical sensor 31' has the same structure as the optical sensor 31. Descriptions of matters common to both will therefore be omitted.

In the optical sensor 31', the shapes of the first opening 40 and the third opening 42 provided in the housing 33 are different from those in the optical sensor 31. Specifically, the first opening 40 is a cylindrical through-hole perpendicular to the circuit board 34. The third opening 42 is also a cylindrical through-hole perpendicular to the circuit board 34. A hatched wall 52 is a side surface on the inner side of the through-hole. Wall-reflected light 53 produced by the wall 52 is incident on the intermediate transfer belt 12a. Because the wall-reflected light 53 is present, the area of a second irradiated region 50' according to the comparative example is greater than the second irradiated region 50 according to the embodiment. If no fine uneven shapes are formed in the surface of the intermediate transfer belt 12a, no diffracted light is produced, so the expansion of the irradiated region does not affect the second light receiving unit 37. The diffuse reflection component is therefore only slightly increased. With the intermediate transfer belt 12a in which the fine uneven shapes are formed, the wall-reflected light 53 is diffracted by the intermediate transfer belt 12a, which produces diffracted light of the +1st order with a high optical intensity. Furthermore, this low-order diffracted light is incident on the second light receiving unit 37. Thus compared to the embodiment, the optical sensor 31' according to the comparative example cannot measure the toner amount or the position of the toner image correctly. On the other hand, the optical sensor 31 according to the embodiment can measure the toner amount or the position of the toner image correctly.

13. Effects of First Embodiment (Effects of Registration Control)

FIG. 14A illustrates a result of detecting a pattern 30a according to the embodiment. FIG. 14B illustrates a result of detecting the pattern 30a according to the comparative example. The horizontal axis represents time. The vertical axis represents the output of each sensor. The pattern 30a is a 2 mm-wide toner image slanted 45° relative to the width direction of the intermediate transfer belt 12a (the y direction). The pattern 30a is formed at 100% image density for each of the Y, M, C, and K colors. When the output is less than the threshold, the controller 29 determines that a leading end of the pattern 30a has been detected. Furthermore, when the output is greater than or equal to the threshold, the controller 29 determines that a following end of the pattern 30a has been detected. The controller 29 recognizes a midpoint between the timing at which the leading end is detected and the timing at which the following end is detected (marked with a circle in the drawing) as a pattern position for each color. The reference color used when determining the amount of color shift is K. The controller 29 finds a relative amount of color shift between the reference color and the other colors Y, M, and C. With the optical sensor 31 according to the embodiment, the detection waveform of the pattern 30a is horizontally symmetrical. On the other hand, the detection waveform of the optical sensor 31' according to the comparative example is asymmetrical.

Figure 15A:
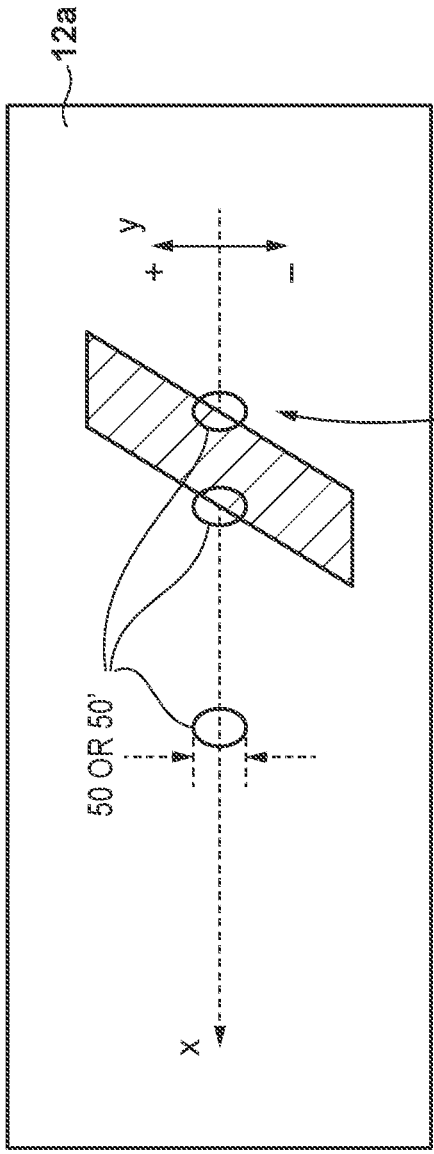
FIGS. 15A to 15C are diagrams illustrating differences between distributions of reflected light intensities.
Figure 15C:
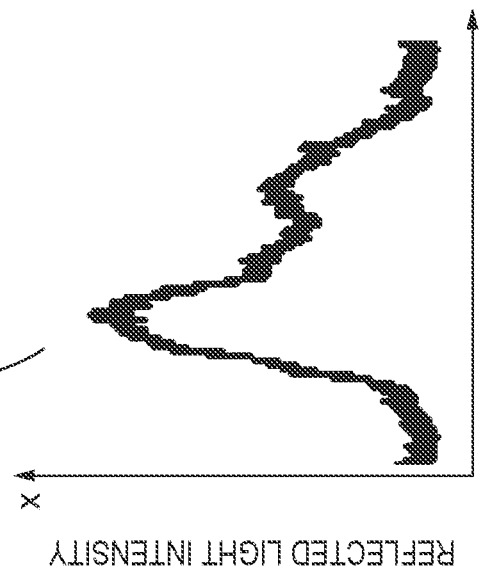
Figure 15B:
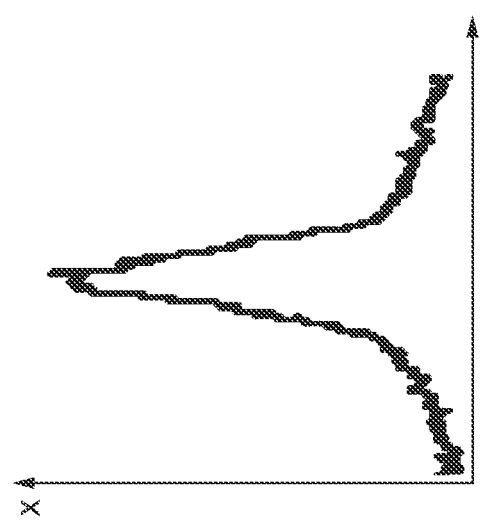

FIG. 15A illustrates a state where a single pattern 30a passes the optical sensors 31 and 31'. FIG. 15B illustrates a reflected light intensity distribution in the width direction (the y direction) for the second irradiated region 50 according to the embodiment. FIG. 15C illustrates a reflected light intensity distribution in the width direction (the y direction) for the second irradiated region 50' according to the comparative example.

As illustrated in FIG. 15B, the reflected light intensity distribution according to the embodiment is horizontally symmetrical. However, as illustrated in FIG. 15C, the reflected light intensity distribution according to the comparative example is horizontally asymmetrical. Furthermore, in the comparative example, there are steps in the reflected light intensity distribution. In the comparative example, the horizontal difference and steps in the reflected light intensity distribution affect the detection of the leading end and the following end of the pattern 30a.

In this manner, the optical sensor 31' according to the comparative example is affected by waveform distortion, which reduces the accuracy with which the position of the pattern 30a is detected. On the other hand, the optical sensor 31 according to the embodiment provides an improved accuracy with which the position of the pattern 30a is detected.

(Effects of Density Control)

Figure 16A:
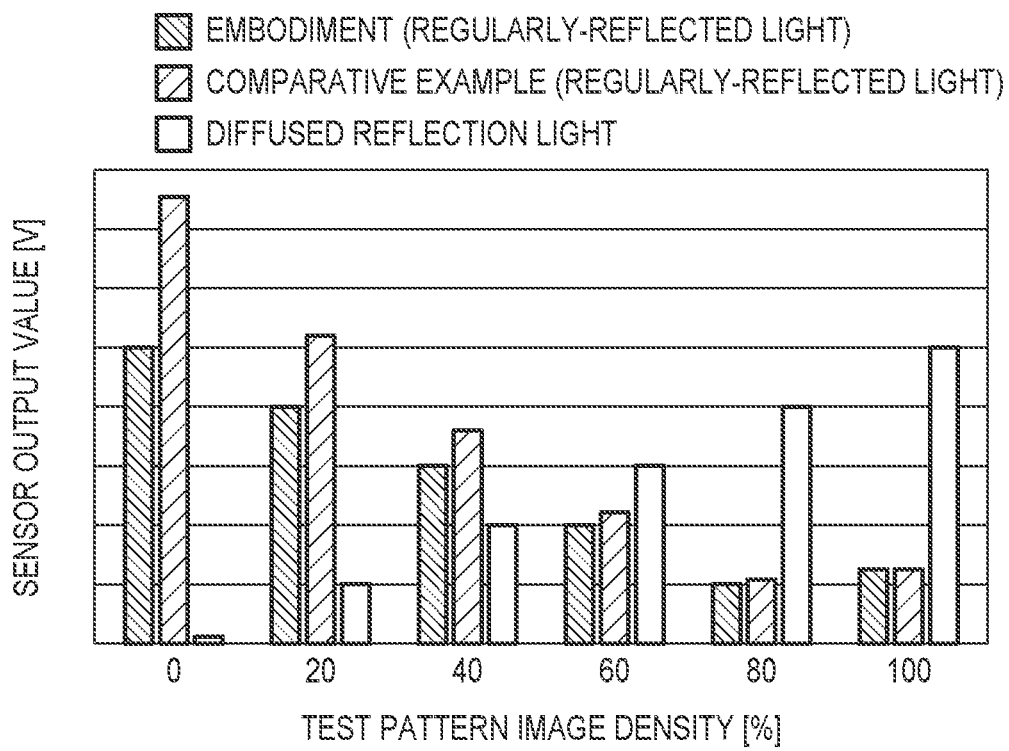
FIGS. 16A and 16B are diagrams illustrating optical sensor outputs and toner amounts.

FIG. 16A illustrates results of the optical sensors 31 and 31' detecting a pattern 30b. The detection results include a result of the detection of regularly-reflected light by the second light receiving unit 37 and a result of the detection of diffused reflection light by the first light receiving unit 36. The horizontal axis represents image density. The vertical axis represents a sensor output value. The image density of the pattern 30b is 0%, 20%, 40%, 60%, 80%, and 100%. There is no difference in the results of detecting diffused reflection light between the optical sensors 31 and 31'.

The optical sensor 31' according to the comparative example receives diffracted light produced in places other than the irradiated region 50 for detecting regularly-reflected light. Accordingly, when the optical sensor 31' receives reflected light from the intermediate transfer belt 12a, the sensor output value of the optical sensor 31' increases. On the other hand, when detecting the pattern 30b having an image density of 20%, 40%, 60%, 80%, and 100%, the toner obscures the grooves 83. Therefore, both optical sensors 31 and 31' are not easily affected by diffracted light. As illustrated in FIG. 16A, the sensor output value for pattern 30b that has an image density of 100% is higher than the sensor output value for the pattern 30b that has an image density of 80%. The reason for this is that as the amount of toner obscuring the intermediate transfer belt 12a increases, so too does the intensity of the diffused reflection light produced by the toner surface. The controller 29 may subtract the output value of the first light receiving unit 36 of the optical sensor 31 from the output value of the second light receiving unit 37. This makes it possible to reduce a diffused reflection light component which enters the second light receiving unit 37.

Figure 16B:
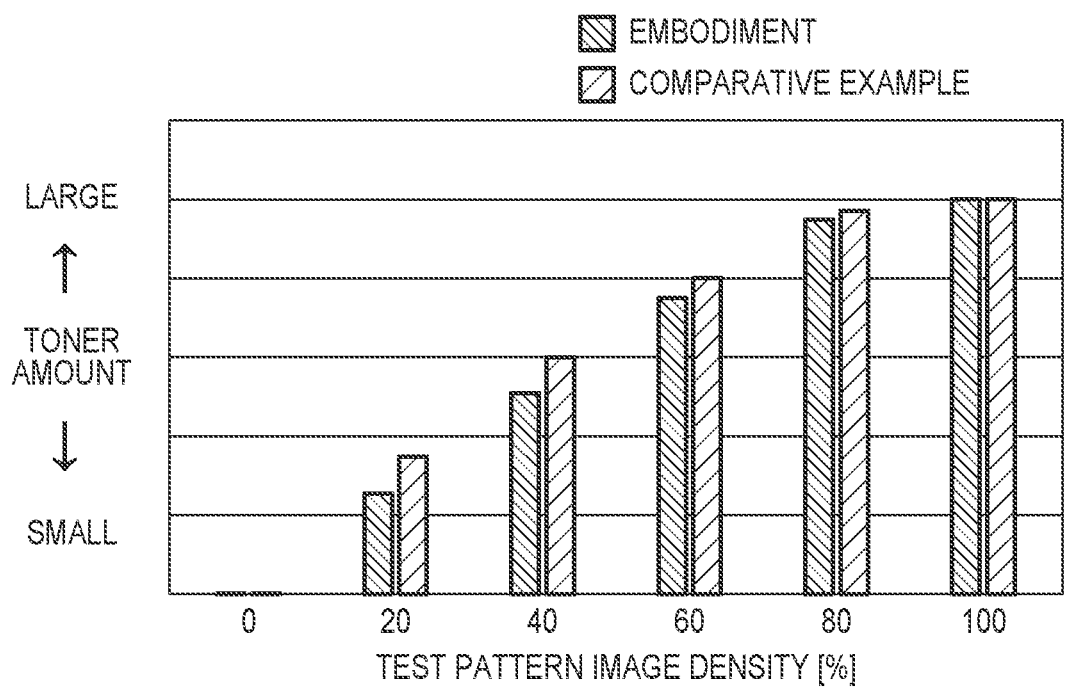

FIG. 16B illustrates toner amounts found from the results of the optical sensors 31 and 31' detecting a pattern 30b. The horizontal axis represents image density. The vertical axis represents the toner amount. As illustrated in FIG. 16B, there is a difference in the toner amount detection results in the low-density range between the embodiment and the comparative example.

Even with the optical sensor 31' according to the comparative example, if the amount of diffracted light incident on the second light receiving unit 37 is constant, the controller 29 will be able to correct the toner amount using a conversion table. However, the uneven shapes present on the surface of the intermediate transfer belt 12a change in accordance with the usage time of the intermediate transfer belt 12a. This is because the surface layer of the intermediate transfer belt 12a is worn by the cleaning blade 22a or paper, which changes the depth of the grooves 83. If the protruding parts of the intermediate transfer belt 12a are smooth and the shape of the grooves 83 (recess parts) is close to rectangular, the plurality of grooves 83 can function as a laminar diffraction grating. The diffraction efficiency of a laminar diffraction grating depends on the depth of the grooves 83 and the duty ratio (the groove width relative to the groove cycle). As the protruding parts of the surface of the intermediate transfer belt 12a are worn down, the grooves 83 become shallower and the diffracted light decreases.

Figure 17:
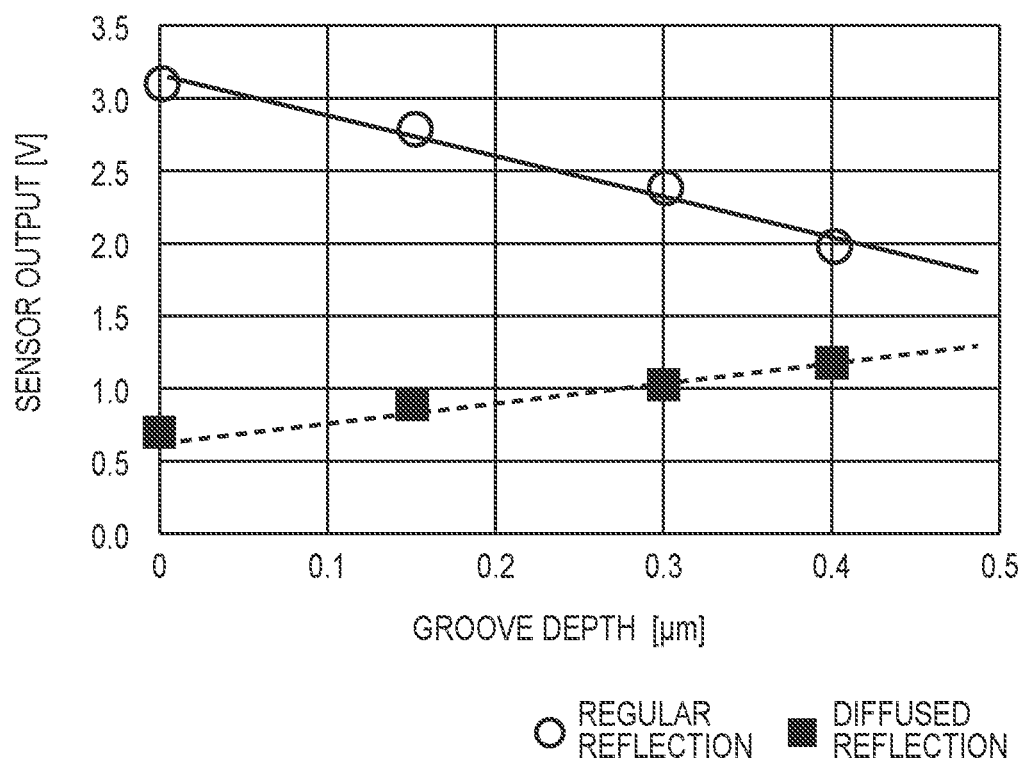
FIG. 17 is a diagram illustrating a relationship between groove depth and optical sensor output.

FIG. 17 illustrates a relationship between the depth of the grooves 83 and the sensor output value. The horizontal axis represents the depth of the grooves 83. The vertical axis represents the sensor output value. As the grooves 83 become shallower, the regularly-reflected light increases and the diffused reflection light decreases. If the depth of the grooves 83 can be measured accurately, it may be possible to estimate the amount of diffracted light which enters. However, it is difficult to accurately measure the depth of the grooves 83. It would therefore likely be difficult to detect the toner amount by taking into account the amount of diffracted light entering.

According to the present embodiment, the incident angle of irradiation light output from a light source and incident on the irradiated region is restricted by the shape of the housing 33. In particular, light rays reflected by the side wall (wall 52) of the through-hole extending from the third opening 42 for the irradiation light toward the light source are unlikely to be incident on the second light receiving unit 37. As such, the optical sensor 31 can accurately detect the target to be measured even if fine uneven shapes are present in the surface of the target to be measured. For example, the position and density of a toner image formed on an intermediate transfer body or image carrier having a plurality of grooves can be detected accurately.

Although the incident angle of the irradiation light is restricted by the shape of the housing in the first embodiment, a housing shape in which the light-receiving region 51 is smaller than the irradiated region 50 may be used as well. In the first embodiment, the second irradiation light 49 and the first irradiation light 46 are described as being parallel light for descriptive purposes. However, the second irradiation light 49 and the first irradiation light 46 may be convergent light.

The second opening 41 is used as both an opening for detecting diffused reflection light and an opening for detecting regularly-reflected light. However, an opening for detecting diffused reflection light and an opening for detecting regularly-reflected light may be provided separately in the housing 33.

The second lens unit 44 is used both as a lens for detecting diffused reflection light and as a lens for detecting regularly-reflected light from the intermediate transfer belt 12a. However, these may be separate lenses. Additionally, although the first lens unit 43 and the third lens unit 45 are separate lenses, these may be realized as a single integrated lens.

The first embodiment describes the first light receiving unit 36 and the second light receiving unit 37 as each including a plurality of light-receiving elements. However, as long as the first light receiving unit 36 and the second light receiving unit 37 can each detect a sufficient amount of light, those units may each be constituted by a single light-receiving element.

Second Embodiment

In the first embodiment, the area of the irradiated region 50 is kept to less than or equal to an appropriate area by using the shape of the housing 33 to restrict the incident angle of the irradiation light. However, there are other ways of limiting the area of the irradiated region 50 to less than or equal to an appropriate area. For example, by further restricting the light emission range of the light source, the intensity distribution of the irradiation light becomes horizontally symmetrical and sharp with respect to the width direction of the intermediate transfer belt 12a. The only difference between the first embodiment and the second embodiment is the configuration of the LED 35.

As illustrated in FIG. 9, the LED 35 includes the light-emitting chip 35a and the light transmitting member 35b which encloses the light-emitting chip 35a. Light output from the light-emitting chip 35a is scattered at a boundary surface of the light transmitting member 35b, and as a result, light is emitted from the entire surface of the light transmitting member 35b. In the second embodiment, the areas of the light-emitting chip 35a and the light transmitting member 35b (and the dimensions in the y direction in particular) are smaller than in the first embodiment. As a result, the incident angle of the second irradiation light 49 is restricted, and the second irradiated region 50 is also reduced in size.

FIG. 18A illustrates a light amount distribution at the second irradiated region 50 for the LED 35 according to the second embodiment. FIG. 18B illustrates a light amount distribution at the second irradiated region 50 for the LED 35 according to the first embodiment. FIG. 18C illustrates the chip width of the LED 35 and the width of the light transmitting member 35b. Here, the surface of the intermediate transfer belt 12a is irradiated with light using a visible light LED of the same model as the LED 35. The light amount distribution (image intensity) is found by capturing that light with a digital camera.

As is clear from FIGS. 18A and 18B, the overall width of the second irradiated region 50 according to the second embodiment is narrower than the overall width of the second irradiated region 50 according to the first embodiment. Additionally, the width at the central part of the second irradiated region 50 according to the second embodiment is narrower than the width at the central part of the second irradiated region 50 according to the first embodiment. An intensity ratio of the bottom to the maximum intensity in the second embodiment is also lower than an intensity ratio of the bottom to the maximum intensity in the first embodiment.

Accordingly, the LED 35 according to the second embodiment is useful for restricting the incident angle of the irradiation light from the light source as well as reducing the amount of light at peripheral areas relative to the central area of the irradiation light. In other words, in the second embodiment, the risk of receiving diffracted light can be reduced more than in the first embodiment. The second light receiving unit 37 according to the second embodiment can accurately detect a regular reflection component, which improves the detection accuracy of the optical sensor 31 according to the second embodiment.

In this manner, reducing the chip width of the LED 35 and the width of the light transmitting member 35b restricts the incident angle of the irradiation light and sharpens the intensity distribution of the light rays. This makes it possible to accurately detect the position and amount of toner on an image carrier having fine uneven shapes.

Third Embodiment

14. Configuration of Toner Sensor

Figure 19A:
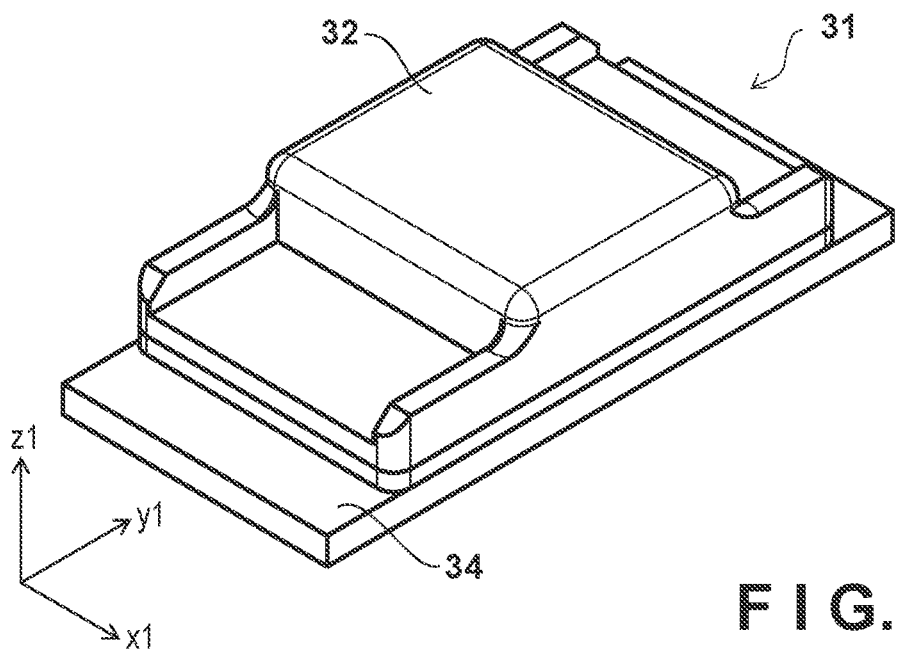
FIGS. 19A and 19B are diagrams illustrating an optical sensor according to a third embodiment.
Figure 19B:
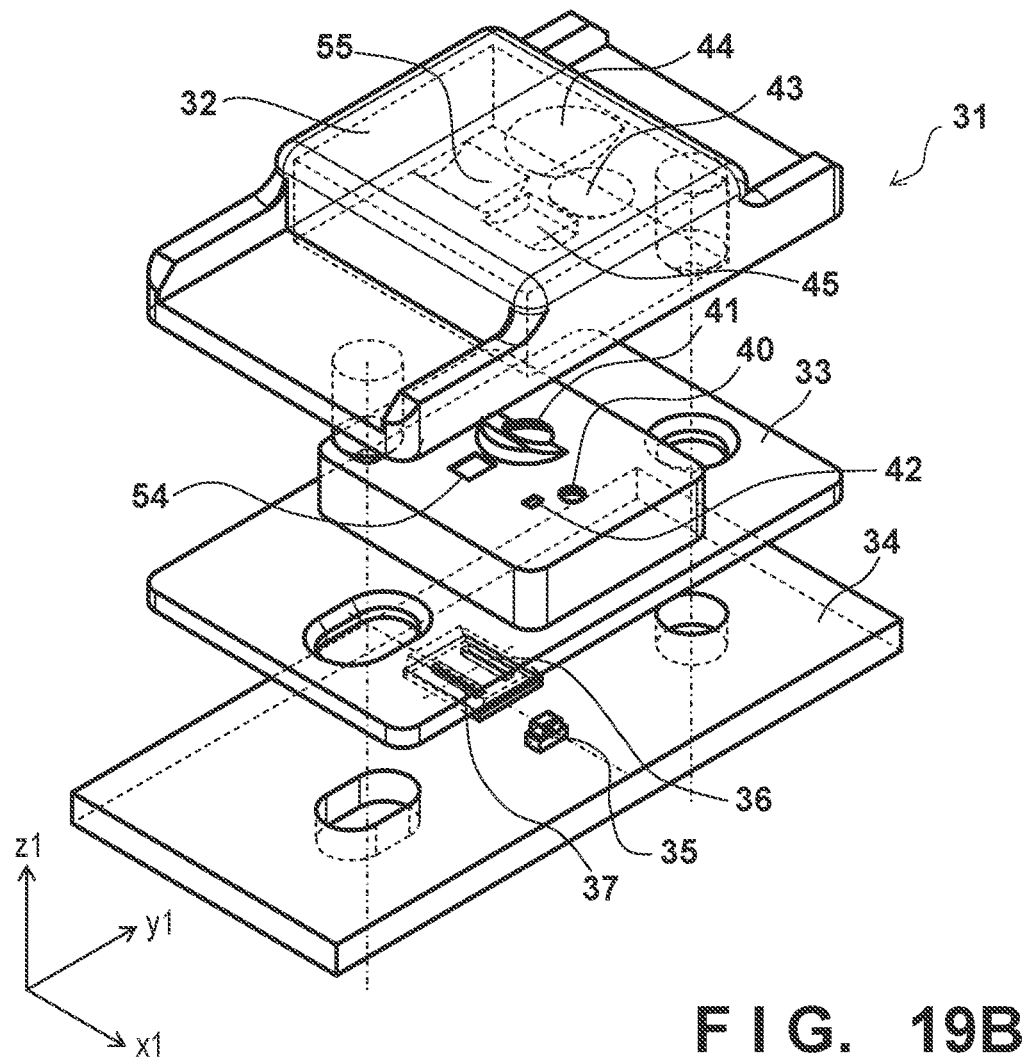

A third embodiment will be described in detail next with reference to FIGS. 19A to 22B. FIG. 19A is a schematic perspective view illustrating the optical sensor 31 after assembly. FIG. 19B is a schematic perspective view (exploded view) illustrating the optical sensor 31 before assembly. In the third embodiment too, x1, y1, and z1 indicate directions (axes) based on the optical sensor 31. In other words, the x1 direction is the shorter direction of the optical sensor 31. The y1 direction is the longer direction of the optical sensor 31. The z1 direction is the height direction of the optical sensor 31 (the normal direction of the circuit board 34).

FIGS. 20A to 20D are diagrams illustrating the optical path of the optical sensor 31 and the arrangement thereof. In particular, FIG. 20A is a schematic cross-sectional view (a cross-sectional view from the left side surface) of the optical sensor 31 when the plus side on the y1 axis is viewed from the minus side. FIG. 20B is a plan view (top view) of the optical sensor 31 when the minus side on the z1 axis is viewed from the plus side. Likewise, FIG. 20C is a schematic cross-sectional view (a cross-sectional view from the right side surface) of the optical sensor 31 when the minus side on the y1 axis is viewed from the plus side. FIG. 20D is a schematic cross-sectional view (a cross-sectional view from the front) of the optical sensor 31 when the minus side on the x1 axis is viewed from the plus side.

A major difference between the third embodiment and the first and second embodiments is that an L-shaped arrangement is used. Here, "L-shaped arrangement" means that the LED 35 and the second light receiving unit 37 are disposed on a straight line that is substantially parallel to the x1 direction, whereas the first light receiving unit 36 and the second light receiving unit 37 are disposed on a straight line that is substantially parallel to the y1 direction, as indicated in FIG. 20B. As such, in the x1 direction, the position of the rotation axis of the drive roller 12b is shifted from the position of the LED 35. In the x1 direction, the second light receiving unit 37 is disposed in a position opposite from the LED 35 with the rotation axis of the drive roller 12b (or a line obtained by projecting the rotation axis onto the circuit board 34) therebetween.

As illustrated in FIG. 19B, the first opening 40, the second opening 41, the third opening 42, and a fourth opening 54 are provided in an upper part of the housing 33. The first lens unit 43, the second lens unit 44, the third lens unit 45, and a fourth lens unit 55 are provided in the cover member 32, which is attached to the top of the housing 33.

As illustrated in FIGS. 20B, 20C, and the like, the first irradiation light 46 travels from the LED 35 toward the intermediate transfer belt 12a. The first opening 40 and the first lens unit 43 form part of the light guide path through which the first irradiation light 46 passes. As illustrated in FIGS. 20A, 20B, and the like, the second irradiation light 49 travels from the LED 35 toward the intermediate transfer belt 12a. The third opening 42 and the third lens unit 45 form part of the light guide path through which the second irradiation light 49 passes.

As illustrated in FIG. 20C and the like, the second opening 41 and the second lens unit 44 form part of a light guide path through which reflected light from the first light-receiving region 48 on the intermediate transfer belt 12a to the first light receiving unit 36 passes.

As illustrated in FIG. 20A and the like, the fourth opening 54 and the fourth lens unit 55 form part of another light guide path through which reflected light from the second light-receiving region 51 on the intermediate transfer belt 12a to the second light receiving unit 37 passes.

As illustrated in FIGS. 20A and 20C, the light-shielding wall 38 is provided in the housing 33. Accordingly, light from the LED 35 is prevented from being directly incident on the first light receiving unit 36 and the second light receiving unit 37.

15. Optical Path for Detecting Diffused Reflection Light

As illustrated in FIG. 20C, the first irradiated region 47 is present in a position shifted from a point 56. Here, the point 56 is a point on the cylindrical surface formed by the intermediate transfer belt 12a wrapping around the drive roller 12b, and is part of a line segment where the distance between the intermediate transfer belt 12a and the optical sensor 31 is the shortest in the z1 direction. The first opening 40 and the first lens unit 43 are arranged so that the first irradiated region 47 is present in a position shifted from the point 56. In other words, the sizes, optical properties, and positions of the first opening 40 and the first lens unit 43 are designed so that a position shifted from the point 56 is irradiated with the first irradiation light 46. In FIG. 20C, an irradiation angle $\theta_{D2x}$ is defined as 14°. The irradiation angle $\theta_{D2x}$ is a component, in the x1 direction, of an angle formed by a straight line connecting the rotation axis of the drive roller 12b with the center of the first irradiated region 47 and the first irradiation light 46. This straight line may be understood as the normal line of the first irradiated region 47 passing through the center of the first irradiated region 47.

The first light-receiving region 48 is a detection region of the first light receiving unit 36. The first light-receiving region 48 is broader than the first irradiated region 47. The first light-receiving region 48 is disposed so as to encompass the entirety of the first irradiated region 47.

As illustrated in FIG. 20D, the first irradiation light 46 moves away from the second irradiation light 49 as the first irradiation light 46 approaches the intermediate transfer belt 12a. In other words, a y1 direction component of the irradiation angle of the first irradiation light 46 and a y1 direction component of the irradiation angle of the second irradiation light 49 do not coincide. Here, an irradiation angle $\theta_{D2y}$ of 39° is defined as the y1 direction component of the irradiation angle of the first irradiation light 46.

The second opening 41 and the second lens unit 44 are disposed so that the first light-receiving region 48 encompasses the entirety of the first irradiated region 47. In other words, the position and size of the first light-receiving region 48 depends on the position and size of the second opening 41, as well as the position, size, and optical properties (e.g., focal length) of the second lens unit 44.

As illustrated in FIG. 20D, the first lens unit 43 is configured so that a light incidence surface thereof is a convex spherical surface. Likewise, the second lens unit 44 is configured so that a light emission surface thereof is a convex spherical surface. In this manner, the first lens unit 43 and the second lens unit 44 each has a curved surface which is convex in the −z1 direction.

In the third embodiment, the first lens unit 43 is designed so that the focal length of the first lens unit 43 is slightly greater than the distance between the first lens unit 43 and the LED 35. As such, the first irradiation light 46 becomes weakly divergent light by passing through the first lens unit 43. For example, the first lens unit 43 is designed so that the radius of the spherical surface thereof is R 2.5 mm. To make the area of the first light-receiving region 48 greater than the area of the first irradiated region 47, the second lens unit 44 is designed so that the focal length of the second lens unit 44 is greater than the distance between the second lens unit 44 and the first light receiving unit 36. For example, the second lens unit 44 is designed so that the radius of the spherical surface thereof is R 4.0 mm.

By designing the optical properties and arrangement of each lens in this manner, the first light receiving unit 36 can detect diffused reflection light from the toner in a stable manner. There are situations where, for example, there is misalignment between the mounting positions of the LED 35 and the first light receiving unit 36, size or positional tolerances with respect to the openings or the lens units, and so on. In such situations, the optical sensor 31 according to the third embodiment can accurately detect diffused reflection light.

Although the radius of the first lens unit 43 is designed so that the first irradiation light 46 becomes weakly divergent light in the third embodiment, this is merely one example. The first lens unit 43 may be designed so that the focal length thereof is equal to the distance from the LED 35 and the first irradiation light 46 becomes parallel light. Alternatively, the first lens unit 43 may be designed so that the radius thereof is smaller than R 2.5 mm, so that the first irradiation light 46 becomes convergent light.

16. Optical Path for Detecting Regularly-Reflected Light

As illustrated in FIG. 20A, the third opening 42 and the third lens unit 45 are arranged so that the approximate center of the second irradiated region 50 coincides with a point 57. Here, the point 57 is a point on the cylindrical surface formed by the intermediate transfer belt 12a wrapping around the drive roller 12b, and is part of a line segment where the distance between the intermediate transfer belt 12a and the optical sensor 31 is the shortest in the z1 direction. An irradiation angle $\theta_{S2x}$ of 15° is defined for the second irradiation light 49. The irradiation angle $\theta_{S2x}$ is a component, in the x1 direction, of an angle formed by the second irradiation light 49 and the normal line of the second irradiated region 50 passing through the point 57. In FIG. 20A, this normal line may be understood as being a straight line passing through the rotation axis of the drive roller 12b and the point 57.

As illustrated in FIG. 19B, the third lens unit 45 is a convex cylindrical lens which has a radius in a y1-z1 plane and a center axis extending in the x1 direction. For example, the radius of the third lens unit 45 is set to R 3 mm. The third opening 42 is quadrangular so that the second irradiated region 50 is also approximately quadrangular (rectangular, in the third embodiment). For example, the third opening 42 is designed so that the size thereof is 0.5 mm×0.7 mm (length in the x1 direction×length in the y1 direction).

As illustrated in FIGS. 20A, 20B, and 20D, the second light-receiving region 51 is a region which can be detected by the second light receiving unit 37. The approximate center of the second light-receiving region 51 coincides with the point 57. Additionally, the area and position of the second irradiated region 50 are designed so that the second light-receiving region 51 encompasses the entirety of the second irradiated region 50. The position and size of the fourth opening 54, as well as the position, size, and optical properties (e.g., focal length) of the fourth lens unit 55, are designed so that this condition is met.

As illustrated in FIG. 19B, the fourth lens unit 55 is also a cylindrical lens. The radius of this cylindrical lens is also present in the y1-z1 plane (strictly speaking, a plane parallel to the y1-z1 plane). For example, the fourth lens unit 55 is designed so that the radius thereof is R 2.3 mm. The center axis of the cylindrical lens extends parallel to the x1 direction. The fourth opening 54 is quadrangular as well. For example, the fourth opening 54 is designed to be 1.2 mm×1.5 mm (length in the x1 direction×length in the y1 direction).

As illustrated in FIG. 20D, the third opening 42 and the third lens unit 45 are arranged so that the second irradiation light 49 is incident on the surface of the intermediate transfer belt 12a having apparently traveled along the normal direction of the circuit board 34. In FIG. 20D, an irradiation angle $\theta_{S2y}$ is defined as 0°. In other words, the second irradiation light 49 does not travel in the y1 direction. As illustrated in FIG. 20A, the direction in which the second irradiation light 49 travels and the normal direction of the circuit board 34 are actually slanted relative to each other. In other words, the second irradiation light 49 is parallel to an x1-z1 plane, but is slanted relative to the y1-z1 plane.

The position and size of the second light-receiving region 51 are also designed so that the second light-receiving region 51 encompasses the entirety of the second irradiated region 50. In other words, the fourth opening 54 and the fourth lens unit 55 are designed so that the second light receiving unit 37 can detect a broader range than the second irradiated region 50.

The third lens unit 45 is designed so that the focal length of the third lens unit 45 is slightly greater than the distance between the third lens unit 45 and the LED 35. As such, the second irradiation light 49 becomes weakly divergent light by passing through the third lens unit 45. The radius of the fourth lens unit 55 is designed so that the focal length of the fourth lens unit 55 is equal to the distance between the fourth lens unit 55 and the second light receiving unit 37.

There are situations where there is misalignment between the mounting positions of the LED 35 and the second light receiving unit 37, size or positional tolerances for the openings or the lens units, and so on. However, in the third embodiment, the second light-receiving region 51 is broader than the second irradiated region 50, and thus the second light receiving unit 37 can detect the second irradiated region 50 in a stable manner.

17. Optical Path of Diffracted Light of First Irradiation Light

Figure 21A:
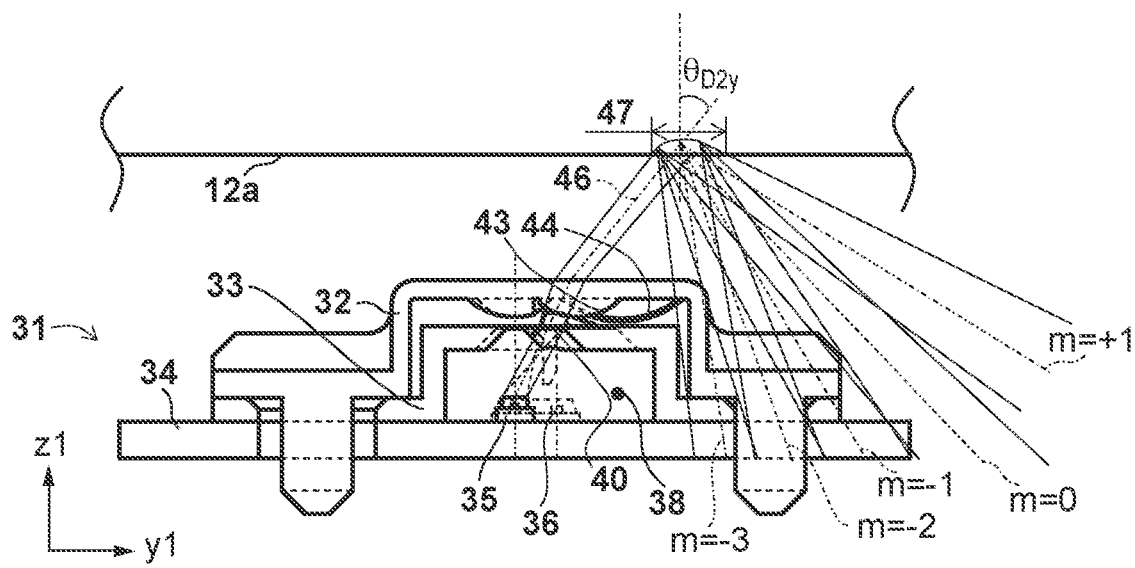
FIGS. 21A and 21B are diagrams illustrating an optical path of diffracted light of first irradiation light according to the third embodiment.
Figure 21B:
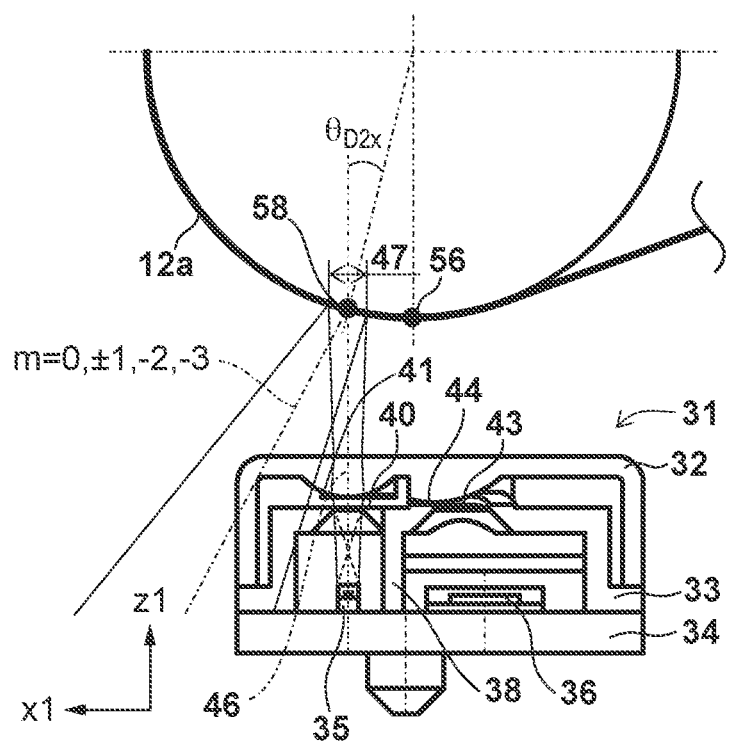

Diffracted light from the intermediate transfer belt 12a, produced by the first irradiation light 46, will be described in detail hereinafter. FIGS. 21A and 21B illustrate an optical path of the diffracted light produced by the first irradiation light 46. In particular, FIG. 21A is a schematic cross-sectional view of the optical sensor 31 when the minus side on the x1 axis is viewed from the plus side. FIG. 21B is a schematic cross-sectional view of the optical sensor 31 when the minus side on the y1 axis is viewed from the plus side.

As described with reference to FIG. 4A, the grooves formed in the intermediate transfer belt 12a are formed so as to follow the circumference of the cylindrical surface. In other words, the plurality of grooves are arranged so as to be parallel to the x1-z1 plane or the rotational direction of the intermediate transfer belt 12a. As illustrated in FIG. 21A, a plurality of instances of diffracted light, each of a different order, travel toward different positions in the y1 direction. In FIG. 21A, the first irradiation light 46 is slanted to the right, and the irradiation angle thereof is $\theta_{D2y}=39°$. Accordingly, reflected light produced at the intermediate transfer belt 12a also travels with a rightward slant (the reflection angle of 0th-order diffracted light (regularly-reflected light) is −39°). As a result, the 0th-order diffracted light of the first irradiation light 46 travels in a direction away from the second lens unit 44 and the second opening 41, which are part of the light guide path for receiving light. Focusing on mth-order diffracted light (where m=−1, +1, −2, −3), the mth-order diffracted light also travels with a rightward slant. In other words, the mth-order diffracted light travels in a direction away from the second lens unit 44 and the second opening 41. Thus with the configuration according to the third embodiment, theoretically, lower-order diffracted light of the first irradiation light 46, i.e., at least less than or equal to m=−3rd order, will not be detected by the first light receiving unit 36.

Focusing on FIG. 21B, the first irradiation light 46 is incident at an angle of $\theta_{D2x}=15°$ on a point 58, which is shifted to the left from the point 56 on the substantially cylindrical-shaped intermediate transfer belt 12a. Accordingly, the 0th-order diffracted light travels with a leftward slant (a reflection angle of −15°). In other words, in FIG. 21B as well, the 0th-order diffracted light of the first irradiation light 46 travels in a direction away from the second lens unit 44 and the second opening 41. The mth-order diffracted light (m=−1, +1, −2, −3) indicated in FIG. 21A travels in a direction away from the second lens unit 44 and the second opening 41. Thus theoretically, lower-order diffracted light will not be detected by the first light receiving unit 36.

The first light receiving unit 36 is an element that detects the diffused reflection light from the toner surface, which is a test patch, on the intermediate transfer belt 12a. To realize a highly-accurate optical sensor 31, it is preferable that the amount of diffracted light incident on the first light receiving unit 36 from the intermediate transfer belt 12a be reduced to the greatest extent possible. As described above, in the third embodiment, the diffracted light from the first irradiation light 46 is unlikely to be incident on the first light receiving unit 36, and thus the diffused reflection light from the toner surface can be detected accurately.

As illustrated in FIG. 21B, the regularly-reflected light and diffracted light originating from the first irradiation light 46 travel in a direction away from the second light receiving unit 37 as well. Therefore, these instances of light are also unlikely to be incident on the second light receiving unit 37. The second light receiving unit 37 is a light receiving unit that detects the regularly-reflected light with which the second light-receiving region 51 is irradiated. Accordingly, the reflected light and diffracted light originating from the first irradiation light 46 should not be detected by the second light receiving unit 37. According to the third embodiment, the reflected light and diffracted light originating from the first irradiation light 46 are unlikely to be detected by the second light receiving unit 37.

18. Optical Path of Diffracted Light of Second Irradiation Light

Figure 22A:
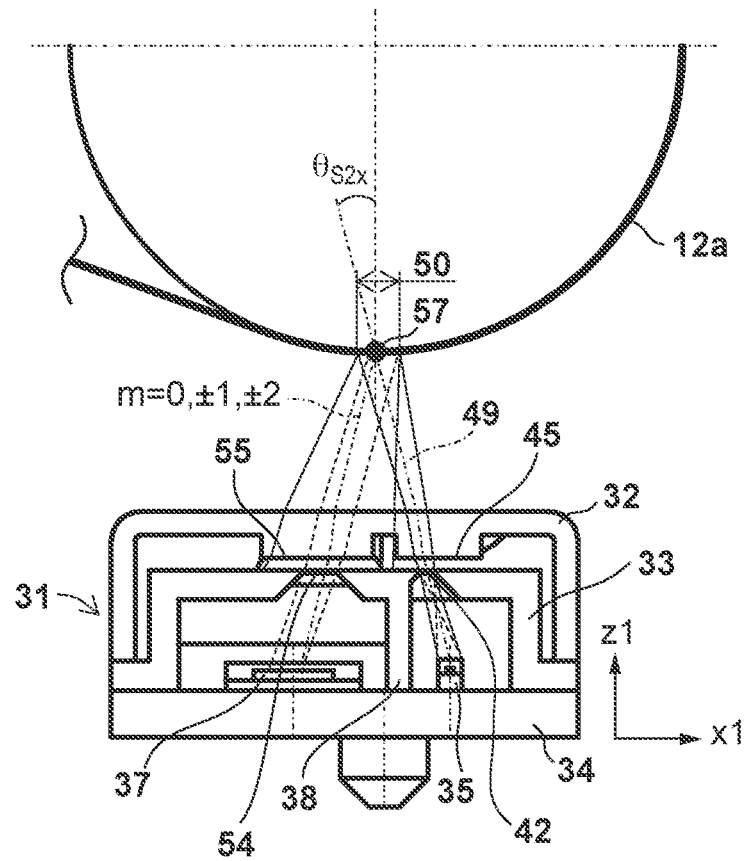
FIGS. 22A and 22B are diagrams illustrating an optical path of diffracted light of second irradiation light according to the third embodiment.
Figure 22B:
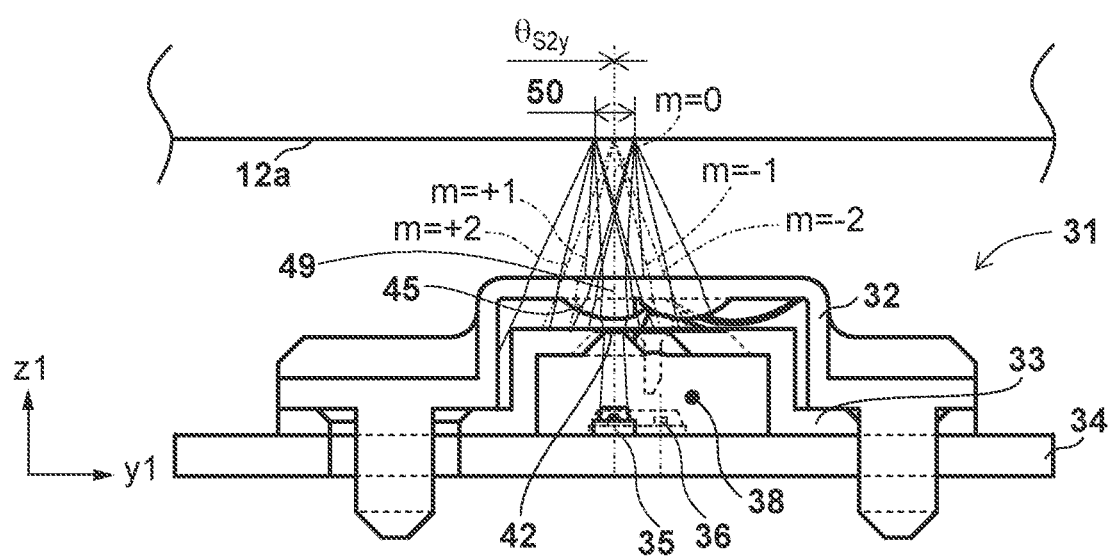

Diffracted light from the intermediate transfer belt 12a, produced by the second irradiation light 49, will be described in detail hereinafter. FIGS. 22A and 22B illustrate an optical path of the diffracted light produced by the second irradiation light 49. In particular, FIG. 22A is a schematic cross-sectional view of the optical sensor 31 when the plus side on the y1 axis is viewed from the minus side. FIG. 22B is a schematic cross-sectional view of the optical sensor 31 when the minus side on the x1 axis is viewed from the plus side.

As described with reference to FIG. 4A, the grooves formed in the intermediate transfer belt 12a are substantially parallel to the circumference of the cylindrical surface illustrated in FIG. 22A (the rotational direction of the intermediate transfer belt 12a). In other words, the plurality of grooves are arranged in the y1 direction indicated in FIG. 22B. Accordingly, a plurality of instances of diffracted light traveling toward different positions in the y1 direction are produced. As described above, in FIG. 22A, the second irradiation light 49 is incident on the intermediate transfer belt 12a at an irradiation angle of $\theta_{S2x}=15°$, centered on the point 57. Accordingly, all diffracted light from the 0th order to the ±2nd order is reflected at an angle of −15°. As illustrated in FIG. 22B, the second irradiation light 49 is apparently incident on the intermediate transfer belt 12a along the normal direction of the intermediate transfer belt 12a. Accordingly, ±1st-order diffracted light and ±2-order diffracted light both travel in an apparently symmetrical manner. In other words, +nth-order diffracted light and −nth-order diffracted light form a pair.

In the third embodiment, only 0th-order diffracted light is incident on the fourth opening 54. Accordingly, the second light receiving unit 37 does not detect higher-order diffracted light, i.e., greater than or equal to ±1st order.

The diffracted light originating from the second irradiation light 49 is not incident on the first light receiving unit 36. This is because the housing 33 is configured to block some of the −1st-order diffracted light and −2nd-order diffracted light of the second irradiation light 49. Here, the first light receiving unit 36 is not disposed on an extension of the diffracted light which has not been blocked. As such, the first light receiving unit 36 does not mistakenly detect the diffracted light originating from the second irradiation light 49.

A reason why only the 0th-order diffracted light enters the fourth opening 54 in the third embodiment will be described in detail next. The surface of the intermediate transfer belt 12a is irradiated with the second irradiation light 49 passing through the third lens unit 45, which is a cylindrical lens. Thus as indicated in FIG. 20B, the shape of the spot of the second irradiation light 49 is broad in the x1 direction and narrow in the y1 direction. As mentioned above, the radius of the third lens unit 45 is set to R 3 mm so that the second irradiation light 49 becomes slightly more divergent than parallel light. Furthermore, the length of the third opening 42 in the y1 direction is 0.7 mm, and is therefore set to an extremely small value. As such, the irradiation range of the second irradiation light 49 is an extremely small range in the y1 direction, and the irradiation angle of the second irradiation light 49 is a relatively uniform irradiation angle. In other words, the angular distribution of the irradiation angle of the second irradiation light 49 is narrower.

On the other hand, the radius of the fourth lens unit 55 is set to a small value (R 2.3 mm). Accordingly, the 0th-order diffracted light passing through the center of the circle of the fourth lens unit 55 enters into the fourth opening 54. The ±1st-order and ±2nd-order diffracted light passing through a position distanced from the center of the circle of the fourth lens unit 55 travels in a direction away from the fourth opening 54. Thus theoretically, only 0th-order diffracted light is incident on the second light receiving unit 37.

In the third embodiment, the radius of the third lens unit 45 is set to R 3 mm. The radius of the fourth lens unit 55 is set to, for example, R 2.3 mm. When the radius of the third lens unit 45 and the radius of the fourth lens unit 55 are both set to R 2.3 mm, the second irradiation light 49 and the reflected light will be perfectly parallel light, and the above effect can be achieved in such a case as well. The stated effect can also be achieved when the radius of the third lens unit 45 is set to R 2.3 mm and the radius of the fourth lens unit 55 is set to R 3 mm 19. Technical Spirit of Third Embodiment The first point is that the irradiation region of the irradiation light is small and the distribution of the irradiation angle is relatively narrow. Ideally, the irradiation light is parallel light.

The second point is that even if tolerance and mounting variations occur during the process of mass-producing the optical sensor 31, a light receiving region that provides a sufficient amount of received light can be secured. However, it is also acceptable to secure only the minimum necessary area for the light receiving region. Furthermore, the lenses may be designed so that the irradiation light becomes weakly divergent light upon passing through the lenses.

As illustrated in FIG. 22B, the intermediate transfer belt 12a is irradiated with the second irradiation light 49 so as to be parallel to the normal direction of the intermediate transfer belt 12a. The longer direction of the circuit board 34 on which the LED 35, the first light receiving unit 36, and the second light receiving unit 37 are mounted is also arranged to be substantially parallel with the y1 direction. The second light receiving unit 37 may be disposed so that the optical axis of regularly-reflected light (0th-order diffracted light) passes through the center of the second light receiving unit 37, the shape of the spot of the regularly-reflected light is symmetrical with respect to this center, and the respective light intensities in the spot are equal. As a result, sufficient performance of the optical sensor 31 is ensured, even if mounting variations or tolerances are present.

As illustrated in FIG. 22B, the second irradiation light 49 travels in what is substantially the normal direction of the circuit board 34, so that the plurality of instances of diffracted light produced by the second irradiation light 49 diffracting on the surface of the intermediate transfer belt 12a travel toward different positions in the y1 direction. In other words, the second irradiation light 49 travels parallel to the x1-z1 plane. However, the stated effect can be achieved even if the LED 35 is disposed on the circuit board 34 with a shift to either the plus side or the minus side on the y1 axis. More specifically, the stated effect can be achieved even if the incident angle of the second irradiation light 49 is slanted by approximately 5° from the normal line of the target surface to be irradiated. Note that when the second irradiation light 49 is slanted by approximately 5° relative to the normal line of the target surface to be irradiated, the parallelism between the LED 35 and the second light receiving unit 37 with respect to the x1 direction in FIG. 20B breaks down. In the third embodiment, the LED 35 and the second light receiving unit 37 are slanted by approximately 29° relative to the x1 direction. However, a slant of approximately 30° will not interfere with the stated effect.

As described above, the second irradiation light 49 is assumed to have small variations in the irradiation angle, and is ideally parallel light, but this is only one example. The distribution of the irradiation angle may extend to approximately 5°. In the third embodiment, the light received is assumed to be weakly divergent light, and is ideally parallel light. However, this is merely one example. The distribution of the reflection angle may vary by approximately 5°.

Here, in the third embodiment, the position and the refractive index of the first lens unit 43 are designed so that the focal length of the first lens unit 43 is slightly greater than the distance between the first lens unit 43 and the LED 35. In other words, the radius of the first lens unit 43 is set so that the focal point of the first lens unit 43 substantially coincides with the position of the light-emitting element. Accordingly, the light emitted from the first lens unit 43 is weakly divergent light.

Although the third embodiment introduces an example in which the irradiation angle $\theta_{S2x}$ is 15°, this is merely one example. The irradiation angle $\theta_{S2x}$ may be 20°, or may be 40°. The stated effect can be achieved in either case. As illustrated in FIG. 20A, the irradiation angle $\theta_{S2x}$ may be understood as the angle between the z1 axis and the second irradiation light 49 in the x1-z1 plane. To increase the irradiation angle $\theta_{S2x}$ while keeping the distance between the optical sensor 31 and the surface of the intermediate transfer belt 12a in the z1 direction to a constant value, the distance between the LED 35 and the point 57 on the intermediate transfer belt 12a in the x1 direction may be increased. Likewise, the distance between the point 57 and the second light receiving unit 37 in the x1 direction may be increased. Although it is impossible to avoid increasing the size of the optical sensor 31 in the x1 direction, the stated effect can be achieved as a result. In this manner, the stated effect can be achieved as long as the optical system is designed so that the reflected light from the target surface to be irradiated is incident on the second light receiving unit 37 in accordance with $\theta_{S2x}$.

Although the third embodiment describes the first light receiving unit 36 and the second light receiving unit 37 as being arranged on a straight line substantially parallel to the y1 direction, this is merely one example. The first light receiving unit 36 and the second light receiving unit 37 may be arranged on a slanted straight line which is not parallel to the y1 direction. In other words, the first light receiving unit 36 may be arranged so that target light produced by the first irradiation light 46 is incident on the first light receiving unit 36, but non-target light (diffracted light) is not incident on the first light receiving unit 36. Likewise, the second light receiving unit 37 may be arranged so that target light produced by the second irradiation light 49 is incident on the second light receiving unit 37, but non-target light (diffracted light) is not incident on the second light receiving unit 37. In other words, it is not necessary for the first light receiving unit 36 and the second light receiving unit 37 to be arranged on a straight line substantially parallel to the y1 direction. Not having the first light receiving unit 36 and the second light receiving unit 37 arranged on a straight line substantially parallel to the y1 direction will merely increase the size of the optical sensor 31 in the x1 direction. As such, having the first light receiving unit 36 and the second light receiving unit 37 arranged on a straight line substantially parallel to the y1 direction can be said to be advantageous in terms of making the optical sensor 31 more compact.

Technical Spirit Derived from Embodiments

<Perspective 1>

The LED 35 is an example of a light-emitting element that emits light toward a target surface to be irradiated set for a target to be measured. The second light receiving unit 37 is an example of a light receiving unit (a first light receiving unit) that receives regularly-reflected light from a surface of the target to be measured. The circuit board 34 is an example of a circuit board on which the light-emitting element and the first light receiving unit are mounted. The housing 33 is an example of a housing including a first opening (e.g., the third opening 42) and a second opening (e.g., the second opening 41), and provided so as to enclose the light-emitting element and the first light receiving unit. As illustrated in FIG. 9 and the like, the first opening is provided in a first light guide path arranged between the light-emitting element and the target surface to be irradiated (e.g., the irradiated region 50), and is arranged so that light output from the light-emitting element travels toward the target surface to be irradiated. The second opening is provided in a second light guide path arranged between the target surface to be irradiated and the light receiving unit. As illustrated in FIG. 9 and the like, the first opening provided in the housing 33 is an exit opening of a through-hole provided penetrating through the housing 33. A shape of the through-hole is a shape in which diffracted light of the +1st order and higher orders and diffracted light of the −1st order and higher orders produced at the target surface to be irradiated are not incident on the light receiving unit. For example, as illustrated in FIG. 7A, an opening is required such that diffracted light originating from other light incident on the target surface to be irradiated at an incident angle (e.g., 0°, −40°) different from the incident angle of light incident on the target surface to be irradiated from the light source (e.g., −20°) is not incident on the light receiving unit. Such other light can be produced by wall surfaces without through-holes. On the other hand, as illustrated in FIG. 11, +1st-order diffracted light and −1st-order diffracted light produced when the second irradiation light 49 diffracts at the irradiated region 50 are not incident on the light receiving unit. This is also a benefit provided by the shape of the through-hole (the light guide path provided in the housing 33). Accordingly, by devising the shape of the through-hole, a drop in detection accuracy of an optical sensor, such as a toner sensor, which can be caused by reflected light from the target surface to be irradiated, can be suppressed.

<Perspective 2>

The shape of the through-hole may be any shape in which, of the light output from the light-emitting element, light reflected by a wall surface of the through-hole is not incident on the light receiving unit via the target surface to be irradiated. Through this, a drop in detection accuracy of an optical sensor, such as a toner sensor, which can be caused by reflected light from the target surface to be irradiated, can be suppressed.

<Perspectives 3 to 8>

As illustrated in FIG. 9 and the like, a size of the exit opening of the through-hole may be any size smaller than a size of an entry opening of the through-hole. This makes it difficult for reflected light, which can arise at an inner wall of the through-hole, to be incident on the light receiving unit. As illustrated in FIG. 9 and the like, a three-dimensional shape of the through-hole may have a cross-sectional area that gradually decreases from the entry opening toward the exit opening. This cross-sectional area is a cross-sectional area parallel to a mounting surface of the circuit board 34. The three-dimensional shape of the through-hole may be a tapered shape. The three-dimensional shape of the through-hole may be a conical trapezoidal shape. An angle formed by an inclined surface of the tapered shape with the circuit board may be 30 degrees. A depth of the through-hole may be 0.2 mm, the depth being a distance from the exit opening to the entry opening of the through-hole. These conditions make it difficult for reflected light that can arise at an inner wall of the through-hole to be incident on the light receiving unit.

<Perspective 9>

The target to be measured may be a rotating body. The target to be measured may be a toner image carried on the rotating body. In this case, the optical sensor is useful as a toner sensor.

<Perspectives 10 and 11>

The rotating body may be an endless belt stretched between a drive roller having a cylindrical shape and a driven roller. To reduce wear on the endless belt, a plurality of grooves 83 may be formed in a surface of the endless belt. Diffracted light can arise in this case. In other words, the optical sensor 31 according to the embodiments can accurately detect the target to be measured even in a case where such a target to be measured is used.

<Perspective 12>

Equation 2 may be established between an incident angle $\theta i$ with respect to the target surface to be irradiated, a wavelength $\lambda$ of the light output from the light-emitting element, and a diffraction angle $\theta m$ of mth-order diffracted light produced by the light diffracting at the plurality of grooves, the grooves being arranged at an interval d. The optical sensor 31 according to the embodiments can accurately detect the target to be measured in such a case as well. In particular, this embodiment is highly effective when the wavelength $\lambda$ of the light is less than 20 μm (in particular, greater than or equal to 400 nm and less than or equal to 1000 nm) and the interval d is greater than or equal to 2 μm and less than or equal to 10 μm.

<Perspective 13>

The light-emitting element may include an emitting chip 35a of an LED 35 and a light transmitting member 35b. As illustrated in FIG. 18C, a width of the emitting chip 35a in a longer direction of the circuit board 34 (the y direction) may be less than or equal to 0.37 mm and greater than or equal to 0.23 mm A width of the light transmitting member 35b in the longer direction of the circuit board 34 may be less than or equal to 3.0 mm and greater than or equal to 1.5 mm. In particular, the narrower these widths become, the smaller the irradiated region 50 becomes, and the less likely it is that unnecessary diffracted light will be incident on the light receiving unit.

<Perspective 14>

The first light receiving unit 36 is an example of a second light receiving unit that receives diffused reflection light incident from the target surface to be irradiated. As described with reference to FIG. 16B, the controller 29 may function as a correction unit that corrects an output of the first light receiving unit, which is the light receiving unit that receives regularly-reflected light, using an output of the second light receiving unit. This makes it possible to accurately find the toner amount.

<Perspectives 15 and 29>

The photosensitive drum 1, the intermediate transfer belt 12a, the secondary transfer roller 16, and the like form an image forming unit that forms a toner image on a sheet S via the rotating body. The optical sensor 31 detects regularly-reflected light from a surface of the rotating body and diffused reflection light from the toner image carried on the surface of the rotating body. The controller 29 functions as an adjustment unit that adjusts a position where the toner image is formed or a density of the toner image on the basis of a detection result from the optical sensor 31. This makes it possible to accurately correct color shifts, the density of the toner image, and color.

<Perspective 16>

The y1 direction described in the third embodiment is an example of a direction in which the plurality of grooves are arranged in the target surface to be irradiated (the first direction). Note that the direction in which the plurality of grooves extend in the target surface to be irradiated may be expressed as the second direction (e.g., the x1 direction). A depth direction of the grooves may be expressed as the third direction (e.g., the z1 direction). As illustrated in FIG. 20D, the light (e.g., the second irradiation light 49) output from the light-emitting element (e.g., the LED 35) is emitted in substantially the normal direction relative to the target surface to be irradiated (e.g., the second irradiated region 50). In other words, the y1 direction and the travel direction of the second irradiation light 49 are orthogonal.

<Perspective 17>

As illustrated in FIG. 20D, the light output from the light-emitting element is substantially parallel light that does not diverge in at least the first direction in which the plurality of grooves are arranged in the target surface to be irradiated (the y1 direction).

<Perspective 18>

As illustrated in FIGS. 20A and 20B, the light-emitting element and the light receiving unit are disposed in different positions on a straight line that is parallel to the second direction (e.g., the x1 direction) and that is on the circuit board 34. As illustrated in FIG. 20A, the light output from the light-emitting element is slanted by a predetermined angle (90 degrees–$\theta_{S2x}$) relative to the second direction (the x1 direction), which is a length direction of the grooves 83. In other words, the light output from the light-emitting element is slanted by a predetermined angle $\theta_{S2x}$ relative to the third direction (the –z1 direction), the third direction being orthogonal to both the first direction and the second direction.

<Perspectives 19 and 20>

As illustrated in FIG. 20D, a first lens (e.g., the third lens unit 45) may be disposed in the first light guide path, and a second lens (e.g., the fourth lens unit 55) may be disposed in the second light guide path. At least one of the first lens and the second lens may have a curved surface (a cylindrical side surface) projecting in the third direction. At least one of the first lens and the second lens may be a cylindrical lens having a flat surface that faces the target surface to be irradiated.

<Perspective 21>

A radius (curvature factor or refractive index) and an attachment position of the first lens may be set so that a focal point of the first lens substantially coincides with a position of the light-emitting element (a first condition). A radius (curvature factor or refractive index) and an attachment position of the second lens may be set so that a focal point of the second lens substantially coincides with a position of the first light receiving unit (a second condition). One or both of the first condition and the second condition may be satisfied.

<Perspective 22>

As illustrated in FIG. 20B, the optical sensor may include a third opening, a fourth opening, and a third light guide path and a fourth light guide path provided in positions different from the first light guide path and the second light guide path. The third opening (e.g., the first opening 40) may be provided in the third light guide path arranged between the light-emitting element and the target surface to be irradiated. The fourth opening (e.g., the second opening 41) may be provided in the fourth light guide path arranged between the target surface to be irradiated and the second light receiving unit (e.g., the first light receiving unit 36). The first light receiving unit (e.g., the second light receiving unit 37) is disposed so that regularly-reflected light, diffracted light, and diffused reflection light from the first irradiated region 47, originating from light (the first irradiation light 46) emitted from the first light guide path, are not incident. The second light receiving unit (the first light receiving unit 36) is disposed so that regularly-reflected light and diffracted light from the second irradiated region 50, originating from light (the second irradiation light 49) emitted from the third light guide path, are not incident.

<Perspective 23>

As illustrated in FIG. 20D, the second light receiving unit (the first light receiving unit 36) may be disposed so that regularly-reflected light, diffracted light, and diffused reflection light from the second irradiated region 50 are not incident.

<Perspective 24>

An angle formed between the first direction and first irradiation light (e.g., the second irradiation light 49) output from the first light guide path toward the target surface to be irradiated is different from an angle formed between the first direction and second irradiation light (e.g., the first irradiation light 46) output from the third light guide path toward the target surface to be irradiated. An angle formed between the first irradiation light and the second direction is different from an angle formed between the second irradiation light and the second direction. These matters are clear from FIGS. 20A, 20C, and 20D.

<Perspective 25>

As illustrated in FIG. 20B, a target surface to be irradiated by the first irradiation light (e.g., the second irradiated region 50) and a target surface to be irradiated by the second irradiation light (e.g., the first irradiated region 47) do not overlap in both the first direction and the second direction.

<Perspective 26>

As illustrated in FIG. 20D, the second irradiation light (e.g., the first irradiation light 46) travels away from the first irradiated region (e.g., the second irradiated region 50) in at least the first direction.

<Perspective 27>

As illustrated in FIGS. 21A and 21B, an irradiation angle of the second irradiation light (e.g., the first irradiation light 46) relative to the target surface to be irradiated is an irradiation angle at which regularly-reflected light and diffracted light originating from the second irradiation light move away from the fourth opening in the first direction.

<Perspective 28>

As illustrated in FIG. 19B, a third lens (e.g., the first lens unit 43) may be disposed in the third light guide path. A fourth lens (e.g., the second lens unit 44) may be disposed in the fourth light guide path.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-024667, which was filed on Feb. 17, 2020, and Japanese Patent Application No. 2020-206984, which was filed on Dec. 14, 2020, both of which are hereby incorporated by reference herein in their entirety.

What is claimed is:

1. An optical sensor comprising:
a belt of which surface is movable;
a light-emitting element that emits light toward the surface of the belt to be irradiated set for a target to be measured;
a first light receiving unit that receives regularly-reflected light from a surface of the target to be measured;
a second light receiving unit that receives diffused reflection light incident from the surface of the target to be irradiated;
a circuit board on which the light-emitting element and the first light receiving unit are mounted; and
a housing including a first opening and a second opening, and provided so as to enclose the light-emitting element and the first light receiving unit,
wherein the first opening is provided in a first light guide path arranged between the light-emitting element and the surface of the target to be irradiated, and is arranged so that light output from the light-emitting element travels toward the surface of the target to be irradiated,
the second opening is provided in a second light guide path arranged between the surface of the target to be irradiated and the first light receiving unit,
the light-emitting element is provided at a position where the light-emitting element and the first light receiving unit overlap each other in a direction in which the surface of the belt moves, and where the light-emitting element and the second light receiving unit do not overlap each other in the direction, and
the first light receiving unit is provided at a position where the first light receiving unit and the second light receiving unit overlap each other in a direction perpendicular to the direction in which the surface of the belt moves.

2. The optical sensor according to claim 1,
wherein the shape of the through-hole is a shape in which, of the light output from the light-emitting element, light reflected by a wall surface of the through-hole is not incident on the first light receiving unit via the surface of the target to be irradiated.

3. The optical sensor according to claim 1,
wherein a size of the exit opening of the through-hole is smaller than a size of an entry opening of the through-hole.

4. The optical sensor according to claim 1,
wherein a three-dimensional shape of the through-hole has a cross-sectional area that gradually decreases from the entry opening toward the exit opening, and the cross-sectional area is a cross-sectional area parallel to a mounting surface of the circuit board.

5. The optical sensor according to claim 4,
wherein the three-dimensional shape of the through-hole is a tapered shape.

6. The optical sensor according to claim 5,
wherein the three-dimensional shape of the through-hole is a conical trapezoidal shape.

7. The optical sensor according to claim 5,
wherein an angle formed by an inclined surface of the tapered shape with the circuit board is 30 degrees.

8. The optical sensor according to claim 3,
wherein a depth of the through-hole is 0.2 mm, the depth being a distance from the exit opening to the entry opening of the through-hole.

9. The optical sensor according to claim 1,
wherein the target to be measured is the belt and a toner image carried on the belt.

10. The optical sensor according to claim 9,
wherein the belt is stretched between a drive roller having a cylindrical shape and a driven roller.

11. The optical sensor according to claim 1,
wherein a plurality of grooves are formed in a surface of the target to be measured.

12. The optical sensor according to claim 11,
wherein the plurality of grooves are formed in the surface of the target to be measured so that $\sin\theta m = m\lambda/d - \sin\theta i$ is established between an incident angle $\theta i$ with respect to the surface of the target to be irradiated, a wavelength $\lambda$ of the light output from the light-emitting element, and a diffraction angle $\theta m$ of mth-order diffracted light produced by the light diffracting at the plurality of grooves, the grooves being arranged at an interval d.

13. The optical sensor according to claim 11, further comprising:
a correction unit that corrects an output of the first light receiving unit using an output of the second light receiving unit.

14. The optical sensor according to claim 13, wherein
the plurality of grooves are arranged in the surface of the target to be irradiated in a first direction, and a travel direction of the light output from the light-emitting element is orthogonal to the first direction.

15. The optical sensor according to claim 14,
wherein the light output from the light-emitting element is substantially parallel light that does not diverge in at least the first direction.

16. The optical sensor according to claim 14,
wherein the light-emitting element and the first light receiving unit are disposed in different positions on a straight line parallel to a second direction, the second direction being a direction in which the plurality of grooves extend on the surface of the target to be irradiated, and
the light output from the light-emitting element is slanted by a predetermined angle relative to a third direction, the third direction being orthogonal to both the first direction and the second direction.

17. The optical sensor according to claim 16, wherein a first lens is disposed in the first light guide path, a second lens is disposed in the second light guide path, and
at least one of the first lens and the second lens has a curved surface projecting in at least the third direction.

18. The optical sensor according to claim 17, wherein at least one of the first lens and the second lens is a cylindrical lens having a flat surface that faces the surface of the target to be irradiated.

19. The optical sensor according to claim 17, wherein a radius of the first lens is set so that a focal point of the first lens substantially coincides with a position of the light-emitting element, a radius of the second lens is set so that a focal point of the second lens substantially coincides with a position of the first light receiving unit, or both.

20. The optical sensor according to claim 14, wherein the housing further includes a third opening and a fourth opening,
the third opening is provided in a third light guide path arranged between the light-emitting element and the surface of the target to be irradiated,
the fourth opening is provided in a fourth light guide path arranged between the surface of the target to be irradiated and the second light receiving unit, and
the second light receiving unit is disposed so that regularly-reflected light, diffracted light, and diffused reflection light from a first irradiated region, originating from light emitted from the first light guide path toward the surface of the target to be irradiated, are not incident, and so that regularly-reflected light and diffracted light from a second irradiated region, originating from light emitted from the third light guide path toward the surface of the target to be irradiated, are incident.

21. The optical sensor according to claim 20, wherein the first light receiving unit is disposed so that regularly-reflected light, diffracted light, and diffused reflection light from the second irradiated region are not incident.

22. The optical sensor according to claim 20, wherein an angle formed between the first direction and first irradiation light output from the first light guide path toward the surface of the target to be irradiated is different from an angle formed between the first direction and second irradiation light output from the third light guide path toward the surface of the target to be irradiated, and
an angle formed between the first irradiation light and the second direction in which the plurality of grooves extend is different from an angle formed between the second irradiation light and the second direction.

23. The optical sensor according to claim 22, wherein a target surface to be irradiated by the first irradiation light and a target surface to be irradiated by the second irradiation light do not overlap in both the first direction and the second direction.

24. The optical sensor according to claim 22, wherein the second irradiation light travels away from the first irradiated region in the first direction.

25. The optical sensor according to claim 22, wherein an irradiation angle of the second irradiation light relative to the surface of the target to be irradiated is an irradiation angle at which regularly-reflected light and diffracted light originating from the second irradiation light move away from the fourth opening in the first direction.

26. The optical sensor according to claim 20, wherein a third lens is disposed in the third light guide path, and a fourth lens is disposed in the fourth light guide path.

27. The optical sensor according to claim 1, wherein the light-emitting element includes an emitting chip and a light transmitting member,
a width of the emitting chip in a longer direction of the circuit board is less than or equal to 0.37 mm and greater than or equal to 0.23 mm, and
a width of the light transmitting member in the longer direction of the circuit board is less than or equal to 3.0 mm and greater than or equal to 1.5 mm.

28. The optical sensor according to claim 1, wherein the first light receiving unit is provided at a position where the first light receiving unit and the second light receiving unit do not overlap each other in the direction in which the surface of the belt moves.

29. The optical sensor according to claim 1, wherein the first light receiving unit is provided at a position where the first light receiving unit and the light-emitting element unit do not overlap each other in a direction perpendicular to the direction in which the surface of the belt moves.

30. The optical sensor according to claim 1, wherein the second light receiving unit is provided at a position where the second light receiving unit and the light-emitting element unit do not overlap each other in a direction perpendicular to the direction in which the surface of the belt moves.

31. An image forming apparatus comprising:
an image forming unit that forms a toner image on a sheet via a rotating body belt;
an optical sensor that detects regularly-reflected light from a surface of the belt and diffused reflection light from the toner image carried on the surface of the belt; and
an adjustment unit that adjusts a position where the toner image is formed or a density of the toner image on the basis of a detection result from the optical sensor,
wherein the optical sensor includes:
a light-emitting element that emits light toward a surface of the target to be irradiated set for a target to be measured;
a first light receiving unit that receives regularly-reflected light from the surface of the target to be measured;
a second light receiving unit that receives diffused reflection light incident from the surface of the target to be irradiated;
a circuit board on which the light-emitting element and the first light receiving unit are mounted; and
a housing including a first opening and a second opening, and provided so as to enclose the light-emitting element and the first light receiving unit,
wherein the first opening is provided in a first light guide path arranged between the light-emitting element and the surface of the target to be irradiated, and is arranged so that light output from the light-emitting element travels toward the surface of the target to be irradiated,
the second opening is provided in a second light guide path arranged between the surface of the target to be irradiated and the first light receiving unit,
the light-emitting element is provided at a position where the light-emitting element and the first light receiving unit overlap each other in a direction in which the surface of the belt moves, and where the light-emitting element and the second light receiving unit do not overlap each other in the direction, and the first light receiving unit is provided at a position where the first light receiving unit and the second light receiving unit overlap each other in a direction perpendicular to the direction in which the surface of the belt moves.

32. The image forming apparatus according to claim 31, wherein the first light receiving unit is provided at a position where the first light receiving unit and the second light receiving unit do not overlap each other in the direction in which the surface of the belt moves.

33. The image forming apparatus to claim 31, wherein the first light receiving unit is provided at a position where the first light receiving unit and the light-emitting element unit do not overlap each other in a direction perpendicular to the direction in which the surface of the belt moves.

34. The image forming apparatus to claim 31, wherein the second light receiving unit is provided at a position where the second light receiving unit and the light-emitting element unit do not overlap each other in a direction perpendicular to the direction in which the surface of the belt moves.

\* \* \* \* \*